US012812402B2

(12) United States Patent
Zhao et al.

(10) Patent No.: US 12,812,402 B2
(45) Date of Patent: Nov. 24, 2026

(54) WIRELESS COMMUNICATION METHOD AND DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Shichang Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 240 days.

(21) Appl. No.: 18/433,304

(22) Filed: Feb. 5, 2024

(65) Prior Publication Data

US 2024/0244449 A1 Jul. 18, 2024

Related U.S. Application Data

(63) Continuation of application No. PCT/CN2021/113218, filed on Aug. 18, 2021.

(51) Int. Cl.

| | |
|---|---|
| ***H04W 16/28*** | (2009.01) |
| ***H04B 7/06*** | (2006.01) |
| ***H04W 72/1268*** | (2023.01) |
| ***H04W 72/231*** | (2023.01) |
| ***H04W 72/25*** | (2023.01) |

(52) U.S. Cl.

CPC .......... *H04W 16/28* (2013.01); *H04B 7/0626* (2013.01); *H04W 72/1268* (2013.01); *H04W 72/231* (2023.01); *H04W 72/25* (2023.01)

(58) Field of Classification Search

CPC ............. H04W 16/28; H04W 72/1268; H04W 72/231; H04W 72/25; H04W 4/40; H04B 7/0626; H04B 7/0695

See application file for complete search history.

(56) References Cited

U.S. PATENT DOCUMENTS

| | | | | |
|---|---|---|---|---|
| 2021/0184824 A1* | 6/2021 | Kwak | .................. | H04L 5/0082 |
| 2021/0352649 A1* | 11/2021 | Kim | ...................... | H04L 5/0053 |
| 2021/0359745 A1* | 11/2021 | Farag | .................... | H04L 1/0071 |

FOREIGN PATENT DOCUMENTS

| | | |
|---|---|---|
| CN | 112839304 A | 5/2021 |
| CN | 112889324 A | 6/2021 |

(Continued)

OTHER PUBLICATIONS

International Search Report in the international application No. PCT/CN2021/113218, mailed on Apr. 24, 2022, 5 pages with English translation.

(Continued)

*Primary Examiner* — Michael A Keller

(74) *Attorney, Agent, or Firm* — Ladas & Parry, LLP

(57) ABSTRACT

Provided are a wireless communication method and device, capable of facilitating selection of an optimal spatial domain transmission filter between a sending terminal and a receiving terminal. The method includes that a first terminal device sends M channel state information reference signals (CSI-RSs) to a second terminal device by using spatial domain transmission filters, the M CSI-RSs being used for selecting a target spatial domain transmission filter, the M CSI-RSs corresponding to a plurality of CSI-RS resources in a target CSI-RS resource set, and M being a positive integer.

16 Claims, 11 Drawing Sheets

(56) References Cited

FOREIGN PATENT DOCUMENTS

| | | | |
|---|---|---|---|
| CN | 113260084 | A | 8/2021 |
| WO | 2020067761 | A1 | 4/2020 |
| WO | 2021034572 | A1 | 2/2021 |
| WO | 2021034691 | A1 | 2/2021 |
| WO | 2021096977 | A1 | 5/2021 |

OTHER PUBLICATIONS

Written Opinion of the International Search Authority in the international application No. PCT/CN2021/113218, mailed on Apr. 24, 2022. 6 pages with English translation.
Supplementary European Search Report in the corresponding European application No. 21953711.5, mailed on Sep. 24, 2024, 11 pages.
First Office Action of the counterpart European patent application No. 21953711.5, issued on Jul. 20, 2026.

* cited by examiner

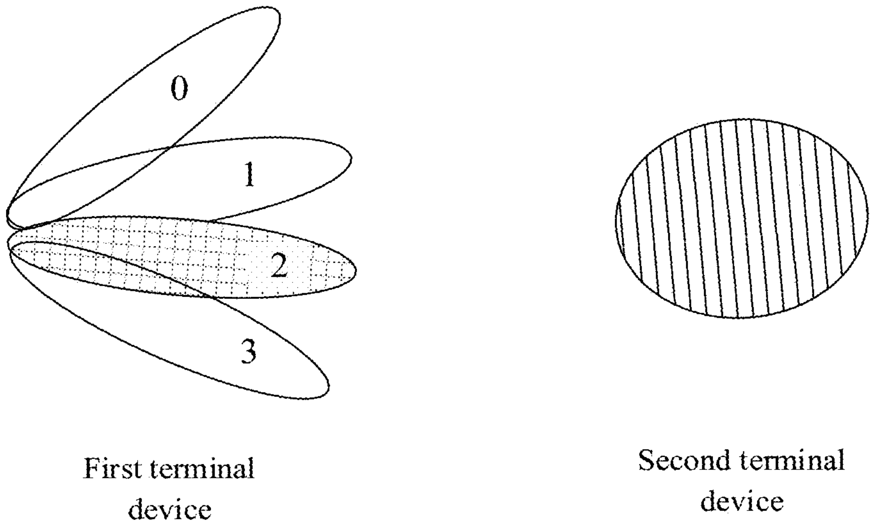
FIG. 12
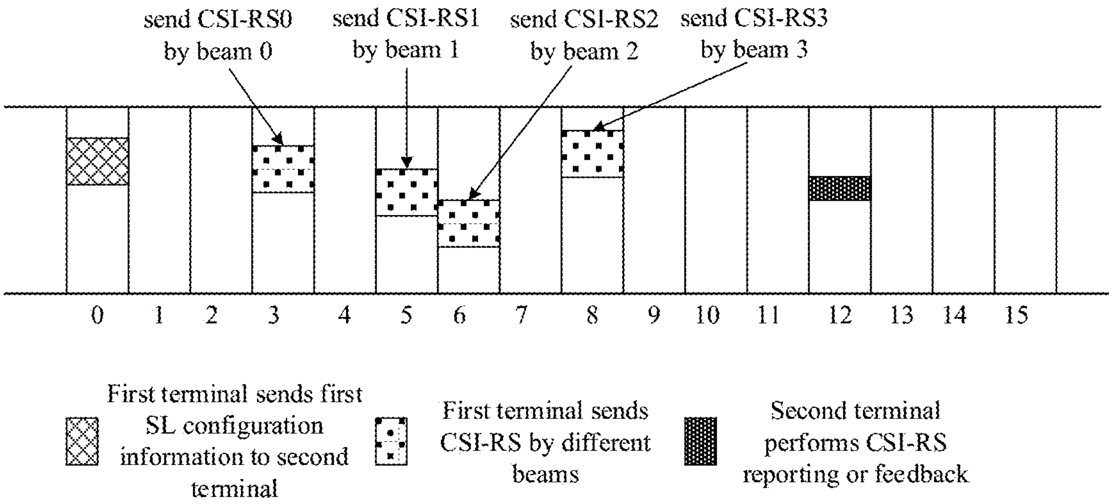
FIG. 13
| | | |
|---|---|---|
| CSI-RS resource 2 | CSI-RS resource 3 | CSI-RS resource 1 |
FIG. 14

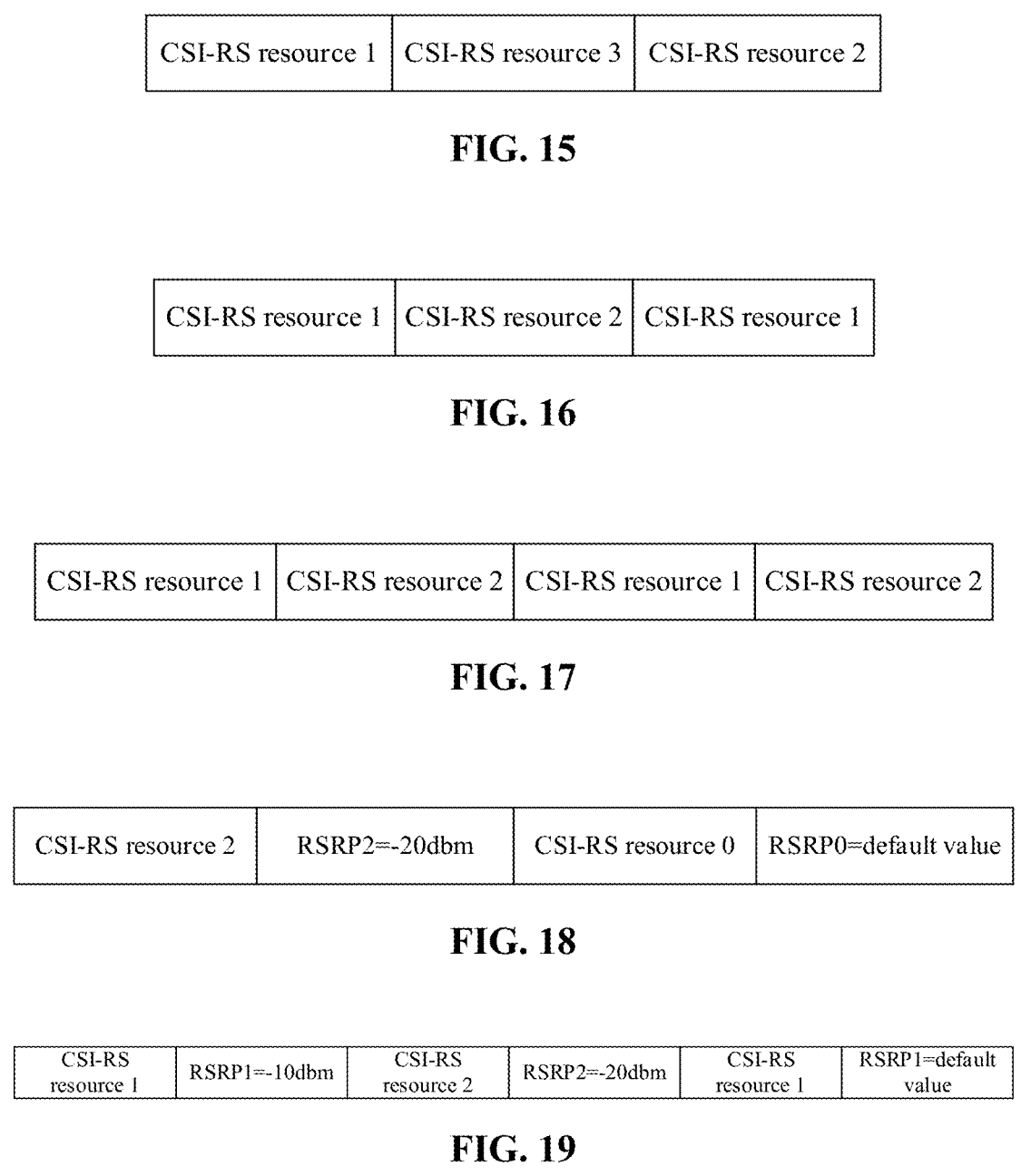

| | | |
|---|---|---|
| CSI-RS resource 1 | CSI-RS resource 3 | CSI-RS resource 2 |

FIG. 15

| | | |
|---|---|---|
| CSI-RS resource 1 | CSI-RS resource 2 | CSI-RS resource 1 |

FIG. 16

| | | | |
|---|---|---|---|
| CSI-RS resource 1 | CSI-RS resource 2 | CSI-RS resource 1 | CSI-RS resource 2 |

FIG. 17

| | | | |
|---|---|---|---|
| CSI-RS resource 2 | RSRP2=-20dbm | CSI-RS resource 0 | RSRP0=default value |

FIG. 18

| | | | | | |
|---|---|---|---|---|---|
| CSI-RS resource 1 | RSRP1=-10dbm | CSI-RS resource 2 | RSRP2=-20dbm | CSI-RS resource 1 | RSRP1=default value |

FIG. 19

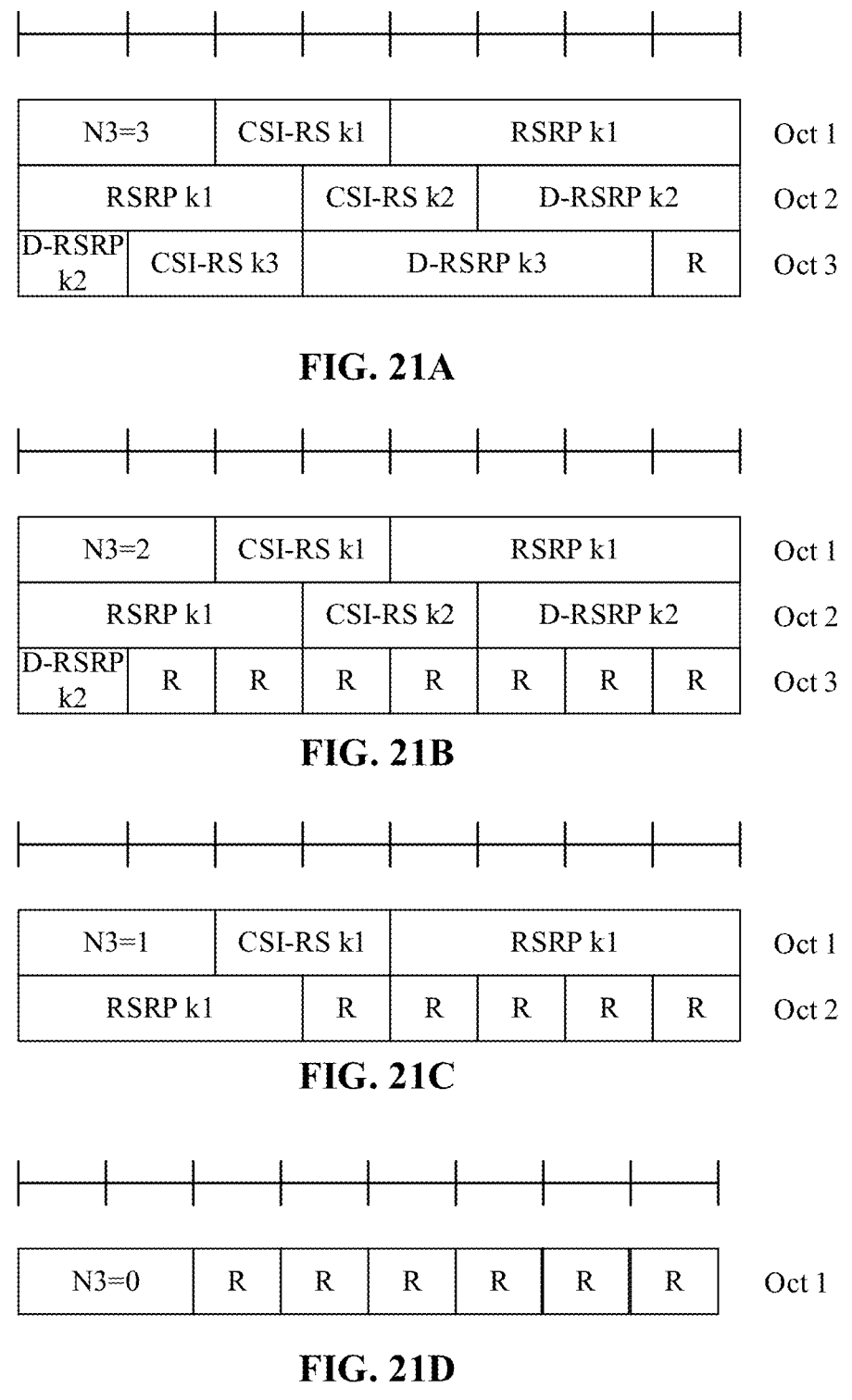

| | | | |
|---|---|---|---|
| N3=3 | CSI-RS k1 | RSRP k1 | Oct 1 |
| RSRP k1 | CSI-RS k2 | D-RSRP k2 | Oct 2 |
| D-RSRP k2 | CSI-RS k3 | D-RSRP k3 R | Oct 3 |

FIG. 21A

| | | | | | | | | |
|---|---|---|---|---|---|---|---|---|
| N3=2 | CSI-RS k1 | RSRP k1 | | | | | | Oct 1 |
| RSRP k1 | CSI-RS k2 | D-RSRP k2 | | | | | | Oct 2 |
| D-RSRP k2 | R | R | R | R | R | R | R | Oct 3 |

FIG. 21B

| | | | | | | | |
|---|---|---|---|---|---|---|---|
| N3=1 | CSI-RS k1 | RSRP k1 | | | | | Oct 1 |
| RSRP k1 | R | R | R | R | R | | Oct 2 |

FIG. 21C

| | | | | | | | |
|---|---|---|---|---|---|---|---|
| N3=0 | R | R | R | R | R | R | Oct 1 |

FIG. 21D

WIRELESS COMMUNICATION METHOD AND DEVICE

CROSS-REFERENCE TO RELATED APPLICATIONS

This application is a continuation application of International Patent Application No. PCT/CN2021/113218 filed on Aug. 18, 2021, the entire contents of which are incorporated herein by reference.

TECHNICAL FIELD

Embodiments of the disclosure relate to the field of communications, and in particular to a method and device for wireless communication.

BACKGROUND

In a New Radio (NR) system, in order to ensure coverage of a high band, an effective solution is to form a shaped beam with a greater gain based on a large-scale antenna array (massive Multiple-Input Multiple-Output (MIMO)) to overcome propagation loss and ensure system coverage. For example, different beams are adopted to cover the entire cell.

In order to improve a transmission rate of a sidelink (SL) communication system, it may be considered to use a high band such as a millimeter wave band in the SL transmission system.

SUMMARY

The disclosure provides a method and device for wireless communication, which is beneficial to select an optimal spatial domain transmission filter between a sending terminal and the receiving terminal.

According to a first aspect, there is provided a method for wireless communication, the method includes the following operations. A first terminal device sends M Channel State Information Reference Signals (CSI-RSs) to a second terminal device by using spatial domain transmission filters, the M CSI-RSs being configured to select a target spatial domain transmission filter. The M CSI-RSs correspond to a plurality of CSI-RS resources in a target CSI-RS resource set, and M is a positive integer.

According to a second aspect, there is provided a method for wireless communication, the method includes the following operations. A second terminal device receives M CSI-RSs from a first terminal device, the M CSI-RSs being configured to select a target spatial domain transmission filter, the M CSI-RSs correspond to a plurality of CSI-RS resources in a target CSI-RS resource set, and M is a positive integer.

According to a third aspect, there is provided a terminal device, which is configured to implement the method in the above first aspect or various implementations thereof.

Specifically, the terminal device includes a functional module configured to implement the method in the above first aspect or various implementations thereof.

According to a fourth aspect, there is provided a terminal device, which is configured to implement the method in the above second aspect or various implementations thereof.

Specifically, the terminal device includes a functional module configured to implement the method in the above second aspect or various implementations thereof.

According to a fifth aspect, there is provided a terminal device, which includes a processor and a memory. The memory is configured to store a computer program, and the processor is configured to call and run the computer program stored in the memory, to implement the method in the above first aspect or various implementations thereof.

According to a sixth aspect, there is provided a terminal device, which includes a processor and a memory. The memory is configured to store a computer program, and the processor is configured to call and run the computer program stored in the memory, to implement the method in the above second aspect or various implementations thereof.

According to a seventh aspect, there is provided a chip, which is configured to implement the method in any one of the above first and second aspects or various implementations thereof.

Specifically, the chip includes a processor configured to call and run a computer program from a memory, to enable a device installed with the chip to implement the method in any one of the above first and second aspects or various implementations thereof.

According to an eighth aspect, there is provided a computer-readable storage medium, which is configured to store a computer program that enables a computer to execute the method in any one of the above first and second aspects or various implementations thereof.

According to a ninth aspect, there is provided a computer program product, which includes computer program instructions that enable a computer to execute the method in any one of the above first and second aspects or various implementations thereof.

According to a tenth aspect, there is provided a computer program, which enables a computer to execute the method in any one of the above first and second aspects or various implementations thereof when the computer program is run on the computer.

Based on the above technical solutions, a sending terminal sends M CSI-RSs to a receiving terminal by using spatial domain transmission filters. Correspondingly, the receiving terminal may measure the M CSI-RSs, which is beneficial to select an optimal spatial domain transmission filter between the sending terminal and the receiving terminal.

BRIEF DESCRIPTION OF THE DRAWINGS

FIG. 12 is a schematic diagram of a transmitting beam used by a sending terminal.

FIG. 13 is a schematic diagram of a process of determining a transmitting beam by a sending terminal and a receiving terminal.

FIG. 14 to FIG. 19 are schematic diagrams of contents included in first information according to embodiments of the disclosure respectively.

FIG. 21A, FIG. 21B, FIG. 21C and FIG. 21D are schematic diagrams of another MAC CE carrying first information according to embodiments of the disclosure.

DETAILED DESCRIPTION

Figure 1:
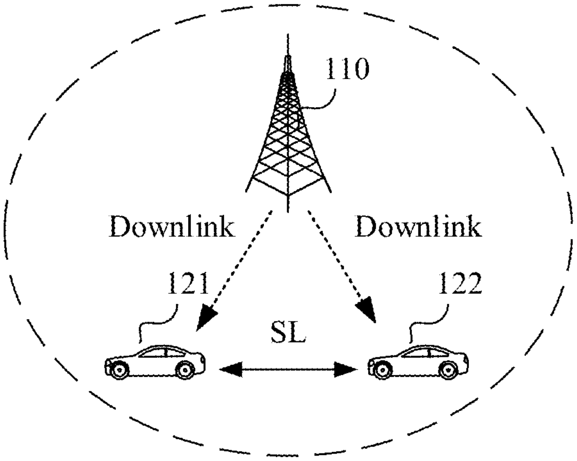
FIG. 1 is a schematic diagram of a communication system architecture provided by the disclosure.

The technical solutions in the embodiments of the disclosure will be described below with reference to the drawings in the embodiments of the disclosure. It is apparent that the described embodiments are part of the embodiments of the disclosure, rather than all of the embodiments. With respect to the embodiments of the disclosure, all other embodiments obtained by those of ordinary skill in the art without paying any creative work belong to the scope of protection of the disclosure.

The technical solutions of the embodiments of the disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolutional system of the NR system, a LTE-based access to unlicensed spectrum (LTE-U) system, an NR-based access to unlicensed spectrum (NR-U) system, a Non-Terrestrial Network (NTN) system, a Universal Mobile Telecommunication System (UMTS), a Wireless Local Area Network (WLAN), a Wireless Fidelity (WiFi), a $5^{th}$-Generation (5G) communication system, or other communication systems, etc.

Generally speaking, a traditional communication system supports a limited number of connections, and is easy to be implemented. However, with the development of communication technologies, a mobile communication system may not only support traditional communication, but also support such as Device to Device (D2D) communication, Machine to Machine (M2M) communication, Machine Type Communication (MTC), Vehicle to Vehicle (V2V) communication, or Vehicle to everything (V2X) communication, or the like. The embodiments may be applied to these communication systems.

Optionally, the communication system in the embodiments may be applied to a Carrier Aggregation (CA) scenario, or may be applied to a Dual Connectivity (DC) scenario, or may be applied to a Standalone (SA) networking scenario.

Optionally, the communication system in the embodiments may be applied to an unlicensed spectrum, and the unlicensed spectrum may be considered as a shared spectrum; or, the communication system in the embodiments may also be applied to a licensed spectrum, and the licensed spectrum may be considered as a non-shared spectrum.

Various embodiments are described in combination with a network device and a terminal device. The terminal device may be referred to as a User Equipment (UE), an access terminal, a user unit, a user station, a mobile station, a mobile platform, a remote station, a remote terminal, a mobile device, a user terminal, a terminal, a wireless communication device, a user agent, or a user device, etc.

The terminal device may be a STATION (ST) in WLAN, or may be a cellular phone, a cordless phone, a Session Initiation Protocol (SIP) phone, a Wireless Local Loop (WLL) station, a Personal Digital Assistant (PDA) device, a handheld device with a wireless communication function, a computing device, or other processing devices connected to a wireless modem, a vehicle-mounted device, a wearable device, a terminal device in a next-generation communication system such as an NR network, or a terminal device in a future-evolved Public Land Mobile Network (PLMN) network, etc.

In the embodiments of the disclosure, the terminal device may be deployed on land, including indoor or outdoor, handheld, wearable, or vehicle-mounted deployment; or, may be deployed on a water surface (such as on a ship); or, may be deployed in the air (such as on an aircraft, a balloon, a satellite, etc.).

In the embodiments of the disclosure, the terminal device may be a mobile phone, a tablet computer (PAD), a computer with a wireless transceiver function, a Virtual Reality (VR) terminal device, an Augmented Reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, or a wireless terminal device in smart home, etc.

As an example rather than limitation, in the embodiments, the terminal device may also be a wearable device. The wearable device may also be referred to as a wearable smart device, which is a general term of wearable devices developed by applying a wearable technology to intelligently design daily wearable objects, such as glasses, gloves, watches, clothing, shoes, etc. The wearable device may be directly worn on the body, or may be a portable device integrated into user's clothing or accessory. The wearable device is not only a hardware device, but also may achieve powerful functions based on software support, data interaction and cloud interaction. A generalized wearable smart device has full functions and a large size, and may implement full or part of the functions without use of a smart phone, for example, such a wearable smart device may be a smart watch, or smart glasses, or the like; or the wearable smart device may only focus on a certain type of application function and needs to be used in cooperation with other devices such as a smart phone, for example, such wearable smart device may be various kinds of smart bracelets, smart jewelry, or the like, for monitoring physical signs.

In the embodiments of the disclosure, the network device may be a device configured to communicate with a mobile device. The network device may be an Access Point (AP) in WLAN, a Base Transceiver Station (BTS) in GSM or CDMA, or a NodeB (NB) in WCDMA, or an Evolutional Node B (eNB or eNodeB) in LTE, or a relay station or AP, or a network device or base station (gNB) in a vehicle-mounted device, a wearable device and an NR network, or a network device in a future-evolved PLMN network, or a network device in an NTN network, etc.

As an example rather than limitation, in the embodiments, the network device may have a mobility characteristic, for example, the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station arranged at land, water area, or other positions.

In the embodiments of the disclosure, the network device may provide services for a cell, and the terminal device may communicate with the network device through transmission resources (such as frequency domain resources or spectrum resources) used by the cell. The cell may be a cell corresponding to the network device, and the cell may belong to a macro base station, or may belong to a base station corresponding to a small cell, the small cell may include a metro cell, a micro cell, a pico cell, a femto cell, etc. The small cells have small coverage and low transmission power, and are suitable for providing high-rate data transmission services.

It should be understood that terms "system" and "network" are often used interchangeably here. In the disclosure, a term "and/or" is only an association relationship describing associated objects, and indicates that there may be three relationships. For example, A and/or B may indicate three cases, that is, A exists alone, A and B exist simultaneously, and B exists alone. Furthermore, in the disclosure, a character "/" generally indicates that anterior and posterior associated objects are in a "or" relationship.

Terms used in the embodiments of the disclosure are only intended to explain specific embodiments, and are not intended to limit the disclosure. Terms "first", "second", "third", "fourth" or the like in the description, claims and the drawings of the disclosure are intended to distinguish different objects, and are not intended to describe a specific order. Furthermore, terms "include", "have" as well as any variants thereof, are intended to cover a non-exclusive inclusion.

It should be understood that "indication" mentioned in the embodiments of the disclosure may be a direct indication, or may be an indirect indication, or may indicate that there is an association relationship. For example, A indicates B, which may mean that A directly indicates B, for example, B may be obtained through A; or, may mean that A indirectly indicates B, for example, A indicates C, and B may be obtained through C; or, may mean that there is an association relationship between A and B.

In descriptions of the embodiments of the disclosure, a term "corresponding" may indicate that there are direct or indirect correspondences between two items; or, may indicate that there is an association relationship between two items; or, may indicate that there is a relationship such as indicating and indicated, configuring and configured, etc.

In the embodiments of the disclosure, "predefined" or "preconfigured" may be implemented by pre-saving corresponding codes, tables or other manners which may be used to indicate related information in devices (for example, including a terminal device and a network device). Specific implementations thereof are not limited in the disclosure. For example, "predefined" may refer to "defined in a protocol".

In the embodiments, "protocol" may refer to a standard protocol in the communication field, such as a LTE protocol, an NR protocol, and related protocols applied to future communication systems, which are not limited in the disclosure.

FIG. 1 is a schematic diagram of a communication system to which the embodiments of the disclosure are applicable. Transmission resources of vehicle-mounted terminals (a vehicle-mounted terminal 121 and a vehicle-mounted terminal 122) are allocated by a base station 110, and the vehicle-mounted terminals may send data on a sidelink (SL) based on the resources allocated by the base station 110. Specifically, the base station 110 may allocate resources for a single transmission to the terminals, or may allocate resources for a semi-static transmission to the terminals.

Figure 2:
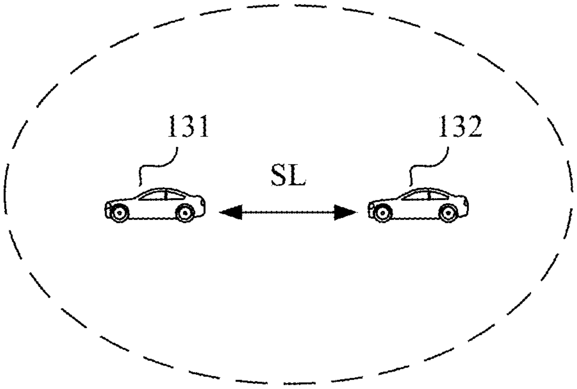
FIG. 2 is a schematic diagram of another communication system architecture provided by the disclosure.

FIG. 2 is a schematic diagram of another communication system to which the embodiments of the disclosure are applicable. Vehicle-mounted terminals (a vehicle-mounted terminal 131 and a vehicle-mounted terminal 132) may autonomously select transmission resources from resources on SL, to perform data transmission. Optionally, the vehicle-mounted terminals may randomly select transmission resources, or select transmission resources by way of listening.

Figure 3:
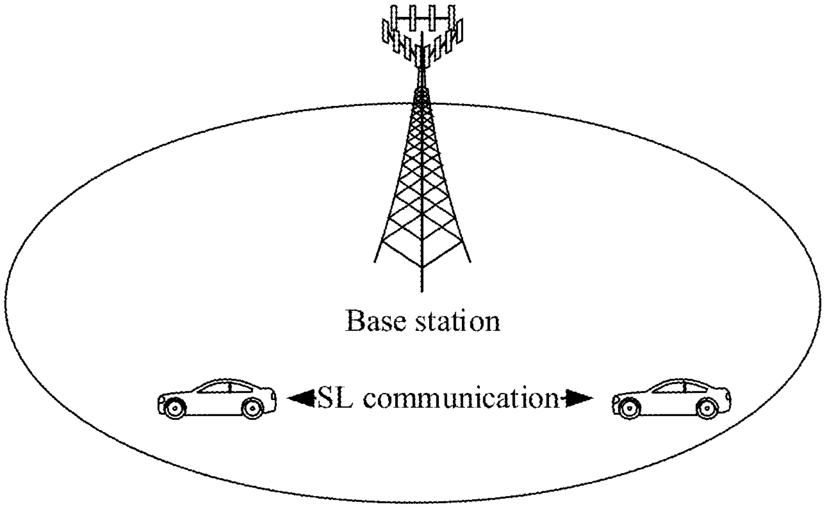
FIG. 3 is a schematic diagram of SL communication within a network coverage provided by the disclosure.
Figure 4:
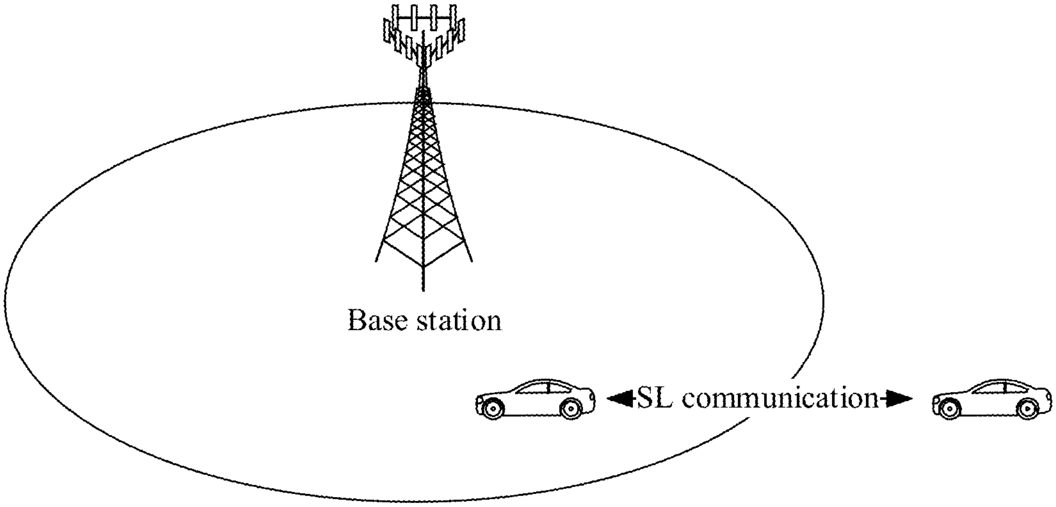
FIG. 4 is a schematic diagram of SL communication within partial network coverage provided by the disclosure.
Figure 5:
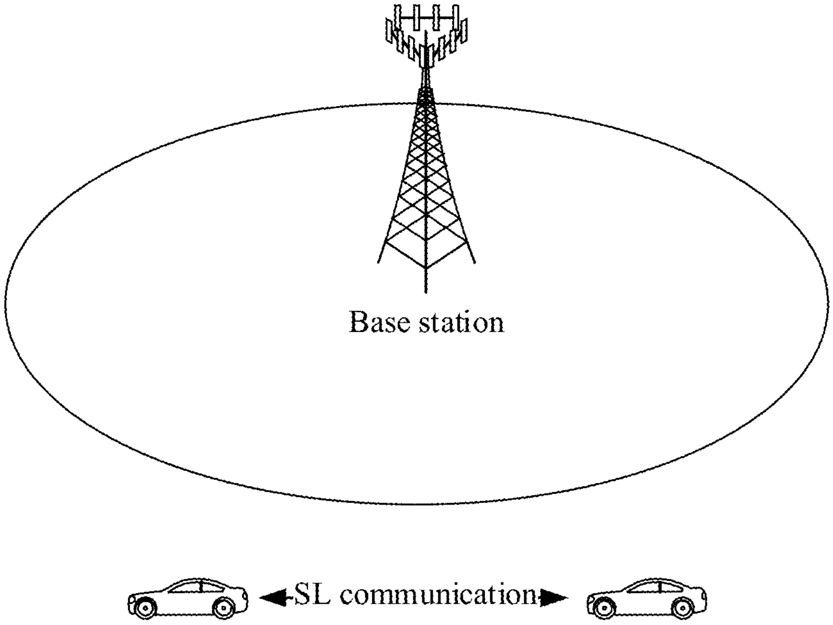
FIG. 5 is a schematic diagram of SL communication out of a network coverage provided by the disclosure.

It should be noted that based on network coverage where a terminal performing communication is located, SL communication may be divided into SL communication within the network coverage as shown in FIG. 3, SL communication within partial network coverage as shown in FIG. 4, and SL communication out of the network coverage as shown in FIG. 5.

FIG. 3: in the case of SL communication within the network coverage, all terminals performing SL communication are within the coverage of the base station. Therefore, the above terminals may perform SL communication based on the same SL configuration by receiving configuration signaling from the base station.

FIG. 4: in the case of SL communication within partial network coverage, part of terminals performing SL communication are within the coverage of the base station, and the part of terminals may receive configuration signaling from the base station and perform SL communication based on configuration of the base station. However, terminals located out of the network coverage cannot receive the configuration signaling from the base station. In this case, the terminals out of the network coverage will determine SL configuration based on pre-configured information and information carried in a Physical Sidelink Broadcast Channel (PSBCH) sent by a terminal within the network coverage, to perform the SL communication.

FIG. 5: in the case of SL communication out of the network coverage, all terminals performing SL communication are located out of the network coverage, and all the terminals determine SL configuration based on pre-configured information, to perform the SL communication.

It should be noted that D2D communication is a SL transmission technology based on D2D, and different from a mode where communication data is received or sent through a base station in a traditional cellular system, a V2X system may adopt a D2D direct communication, and thus has a higher spectral efficiency and a lower transmission delay. Two transmission modes are defined in 3rd Generation Partnership Project (3GPP) and are recorded as a first mode and a second mode respectively.

In the first mode, transmission resources of a terminal may be allocated by a base station, and the terminal may send data on SL based on the resources allocated by the base station; the base station may allocate resources for a single transmission to the terminal, or may allocate resources for semi-static transmission to the terminal. As shown in FIG. 3, the terminal is located within the network coverage, and the network allocates transmission resources for SL transmission to the terminal.

In the second mode, a terminal may select a resource from a resource pool, to perform data transmission. As shown in FIG. 5, the terminal is located out of a cell coverage, and the terminal autonomously selects transmission resources from a pre-configured resource pool, to perform SL transmission; or, as shown in FIG. 3, the terminal autonomously selects transmission resources from a resource pool configured by the network, to perform SL transmission.

Autonomous driving is supported in New Radio Vehicle to everything (NR-V2X), therefore higher requirements are made on data interaction between vehicles, such as higher throughput, lower delay, higher reliability, greater coverage, more flexible resource allocation, etc.

Figure 6:
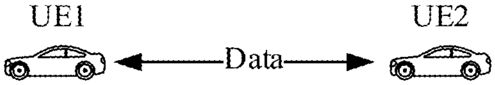
FIG. 6 is a schematic diagram of unicast SL communication provided by the disclosure.
Figure 7:
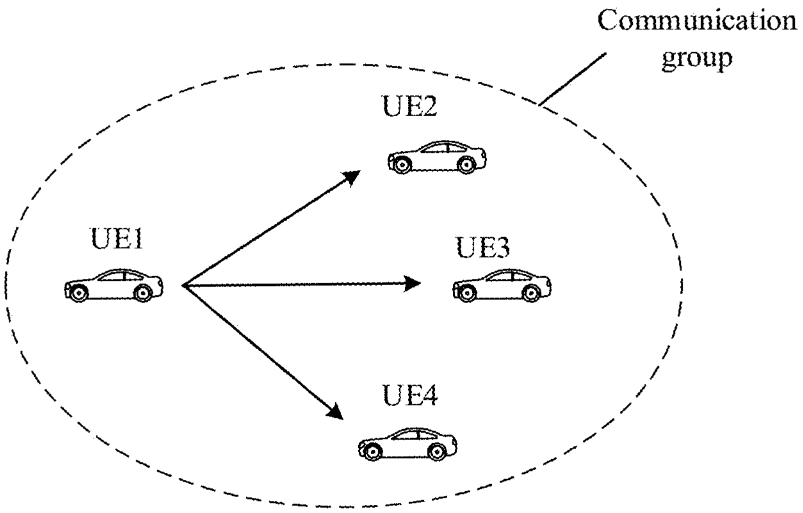
FIG. 7 is a schematic diagram of multicast SL communication provided by the disclosure.
Figure 8:
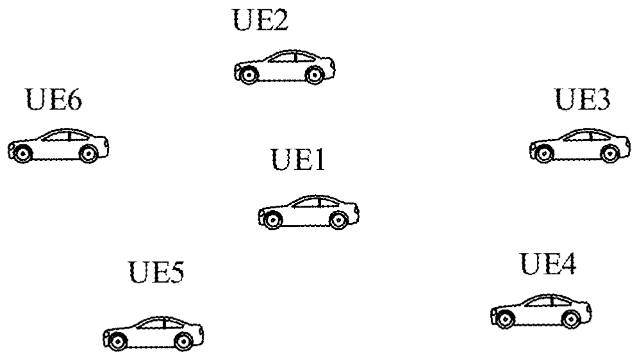
FIG. 8 is a schematic diagram of broadcast SL communication provided by the disclosure.

A broadcast transmission mode is supported in Long Term Evolution Vehicle to everything (LTE-V2X), and unicast and multicast transmission modes are introduced into NR-V2X. For unicast transmission, there is only one terminal used as a receiving terminal, and as shown in FIG. 6, unicast transmission is performed between UE1 and UE2. For multicast transmission, all terminals in a communication group or all terminals within a certain transmission distance serve as receiving terminals, and as shown in FIG. 7, UE1, UE2, UE3 and UE4 form a communication group, in which UE1 sends data, and other UEs in the group are receiving terminals. In the broadcast transmission mode, any terminal around the sending terminal may serve as a receiving terminal, and as shown in FIG. 8, UE1 is the sending terminal, and other terminals around UE1, i.e., UE2 to UE6 are all receiving terminals.

In order to facilitate understanding the embodiments of the disclosure better, slot structures in NR-V2X will be described with reference to FIG. 9A and FIG. 9B.

Figure 9A:
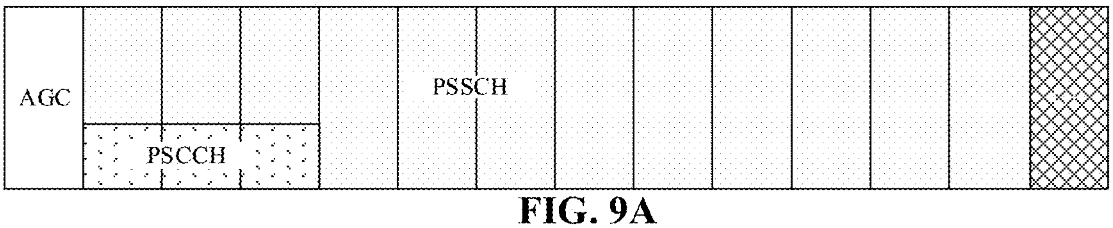
FIG. 9A and FIG. 9B are schematic diagrams of slot structures of New Radio Vehicle to everything (NR-V2X).

FIG. 9A represents a structure of a slot excluding a Physical Sidelink Feedback Channel (PSFCH); FIG. 9B represents a structure of a slot including a PSFCH.

As shown in FIG. 9A, a Physical Sidelink Control Channel (PSCCH) starts from the second SL symbol of the slot in time domain and occupies two or three Orthogonal Frequency Division Multiplexing (OFDM) symbols, and the PSCCH may occupy {10, 12, 15, 20, 25} Physical Resource Blocks (PRBs) in frequency domain. In order to reduce complexity of UE's blind detection on the PSCCH, only one PSCCH symbol and one PRB are allowed to be configured in a resource pool. In addition, since a sub-channel is the minimum granularity of Physical Sidelink Shared Channel (PSSCH) resource allocation in NR-V2X, the number of PRBs occupied by the PSCCH is required to be less than or equal to the number of PRBs included in one sub-channel within the resource pool, to prevent imposing additional restrictions on PSSCH resource selection or allocation. The PSSCH also starts from the second SL symbol of the slot in time domain, a last time-domain symbol in the slot is a Guard Period (GP) symbol, and the remaining symbols are mapped to the PSSCH. The first SL symbol in the slot is repetition of the second SL symbol. A receiving terminal generally uses the first SL symbol as an Automatic Gain Control (AGC) symbol, and data on the AGC symbol is generally not used for data demodulation. The PSSCH occupies P sub-channels in frequency domain, and each sub-channel includes Q consecutive PRBs, here P and Q are positive integers.

Figure 9B:
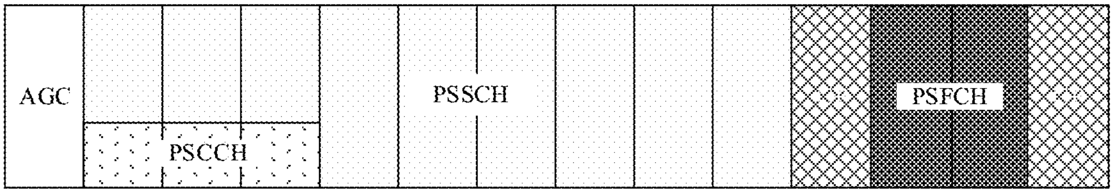

As shown in FIG. 9B, when a slot includes a PSFCH, penultimate and antepenultimate symbols in the slot are used for PSFCH transmission, and a time domain symbol before the PSFCH channel is used as a GP symbol.

In order to facilitate understanding the embodiments of the disclosure better, a multi-beam system related to the disclosure will be described.

Design goals of the NR system include large bandwidth communication in a high band (for example, a band above 6 GHz). When an operating frequency becomes higher, path loss during transmission may increase, thereby affecting coverage capability of a high-frequency system. In order to effectively ensure coverage of the NR system at the high band, an effective technical solution is to form a shaped beam with a greater gain based on a large-scale antenna array (massive Multiple-Input Multiple-Output (MIMO)), to reduce propagation loss and ensure system coverage.

Due to a shorter wavelength, smaller antenna element sub-spacing and smaller aperture of a millimeter wave antenna array, the millimeter wave antenna array may allow more physical antenna elements to be integrated in a limited-sized two-dimensional antenna array. Furthermore, due to the limited size of the millimeter wave antenna array, by considering hardware complexity, cost overhead, power consumption or other factors, digital beamforming cannot be used, instead, analog beamforming is usually used, which may reduce implementation complexity of a device while enhancing network coverage.

In 2nd Generation (2G)/3rd Generation (3G)/4th Generation (4G) systems, a cell (sector) may use a wider beam to cover the entire cell. Therefore, at each time point, UEs within coverage of the cell have a chance to obtain transmission resources allocated by the system.

A multi-beam system of the NR covers the entire cell through different beams, that is, each beam covers a small range, and an effect of multiple beams covering the entire cell is achieved through time sweeping.

Figure 10A:
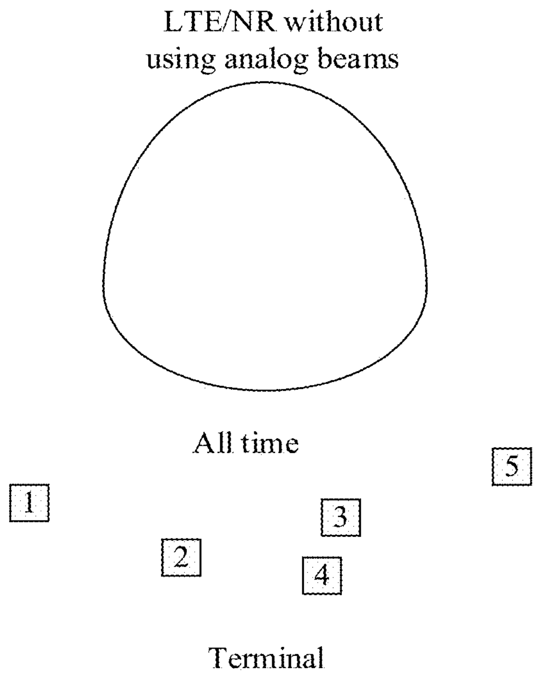
FIG. 10A and FIG. 10B are schematic diagrams of a system without using analog beams and a system using analog beams.
Figure 10B:
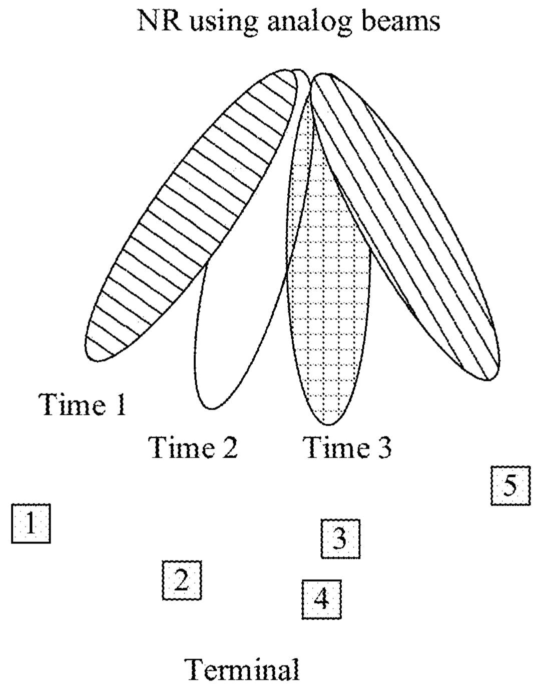

FIG. 10A and FIG. 10B show schematic diagrams of a system without using beamforming and a system using beamforming. FIG. 10A is a schematic diagram of traditional LTE system and NR system without using beamforming, and FIG. 10B is a schematic diagram of an NR system using beamforming.

In some scenarios, different beams are identified by different signals carried on the beams.

For example, different Synchronization Signal/Physical Broadcast Channel blocks (SS/PBCH blocks, or referred to as SSB) are transmitted on different beams, and UE may identify different beams through different SSBs.

For another example, different Channel State Information Reference Signal (CSI-RSs) are transmitted on different beams, and UE may identify different beams through CSI-RS signals/CSI-RS resources.

In a multi-beam system, a Physical Downlink Control Channel (PDCCH) and a Physical Downlink Shared Channel (PDSCH) may be transmitted through different downlink transmitting beams.

For example, in a system with a carrier frequency below 6 GHz, there is usually no analog beam on a terminal device side, therefore omnidirectional antennas (or near-omnidirectional antennas) are used to receive signals sent through different downlink transmitting beams by a base station.

For another example, in a millimeter wave system, there may be an analog beam on a terminal device side, and a corresponding downlink receiving beam needs to be used to receive signals sent through a corresponding downlink transmitting beam. In this case, corresponding beam indication information is required to assist the terminal device to determine related information of a transmitting beam on a network device side, or related information of a corresponding receiving beam on the terminal device side.

In the NR system, the beam indication information does not directly indicate the beam itself, instead, indicates the beam by quasi-co-located (QCL) ('QCL-TypeD' type) between signals. Determination of receiving statistical characteristics of a channel/signal on the terminal device side is also based on QCL assumption.

In order to facilitate understanding the embodiments of the disclosure better, QCL indication or assumption of downlink transmission will be described.

When the terminal device receives signals, the terminal device may improve a receiving algorithm by using characteristics of a transmission environment corresponding to data transmission, to improve receiving performance. For example, a design and parameters of a channel estimator may be optimized by using statistical characteristics of the channel. In the NR system, these characteristics corresponding to data transmission are represented by a QCL state (QCL-Info).

When downlink transmission comes from different Transmission Reception Points (TRP)/panels/beams, characteristics of a transmission environment corresponding to data transmission may also change. Therefore, in the NR system, when a network device transmits a downlink control channel or data channel, the network device may indicate corresponding QCL state information to a terminal device through a Transmission Configuration Indicator (TCI) state.

In some embodiments, a TCI state may include the following configurations:

a TCI state identifier (ID), configured to identify a TCI state;

QCL information 1; and

QCL information 2 (optional).

QCL information may include the following information:

QCL type configuration, which may be QCL typeA, or QCL typeB, or QCL typeC or QCL typeD; and QCL reference signal configuration, including ID of a cell where the reference signal is located, Band Width Part (BWP) ID, and ID of the reference signal (which may be a CSI-RS resource ID or a Synchronization Signal Block (SSB) index).

When both QCL information 1 and QCL information 2 are configured, the QCL type of at least one QCL information is required to be one of QCL typeA, QCL typeB and QCL typeC, and the QCL type of another QCL information is required to be QCL typeD.

Definitions of different QCL type configurations are as follows:

'QCL-TypeA': {Doppler shift, Doppler spread, average delay, delay spread};

'QCL-TypeB': {Doppler shift, Doppler spread};

'QCL-TypeC': {Doppler shift, average delay};

'QCL-TypeD': {Spatial Rx parameter}.

In the NR system, the network device may indicate a corresponding TCI state for a downlink signal or downlink channel.

When the network device configures a QCL reference signal of a target downlink channel or target downlink signal as a reference SSB or reference CSI-RS resource through the TCI state, and the QCL type is configured as typeA, typeB or typeC, the terminal device may assume that the target downlink signal is the same as a large-scale parameter of the reference SSB or the reference CSI-RS resource, and the large-scale parameter is determined through the QCL type configuration.

Similarly, when the network device configures a QCL reference signal of a target downlink channel or downlink signal as a reference SSB or reference CSI-RS resource through the TCI state, and the QCL type is configured as typeD, the terminal device may receive the target downlink channel or target downlink signal by using a receiving beam (i.e., a Spatial Rx parameter) which is the same as that for receiving the reference SSB or reference CSI-RS resource. In general, the target downlink channel (or downlink signal) and its reference SSB or reference CSI-RS resource may be sent through the same TRP or the same panel or the same beam by the network device. When transmission TRPs or transmission panels or transmitting beams of two downlink signals or downlink channels are different, different TCI states are usually configured.

For a downlink control channel, a TCI state of a Control Resource Set (CORESET) may be indicated by Radio Resource Control (RRC) signaling or RRC signaling plus Media Access Control (MAC) signaling.

For a downlink data channel, a set of available TCI states may be indicated by RRC signaling, part of the TCI states may be activated by MAC layer signaling, and finally, one or two TCI states among the activated TCI states may be indicated by a TCI state indication field in Downlink Control Information (DCI), to be used for the PDSCH scheduled by the DCI.

In order to improve a transmission rate of a SL communication system, it may be considered to use a millimeter wave band in the SL transmission system. In this case, how to select an optimal transmitting beam between a sending terminal and a receiving terminal is a problem to be solved.

Based on the above technical problem, a solution is proposed for determining an optimal spatial domain transmission filter between a sending terminal and a receiving terminal, which is beneficial to determine an optimal spatial domain transmission filter between a sending terminal and a receiving terminal.

Figure 11:
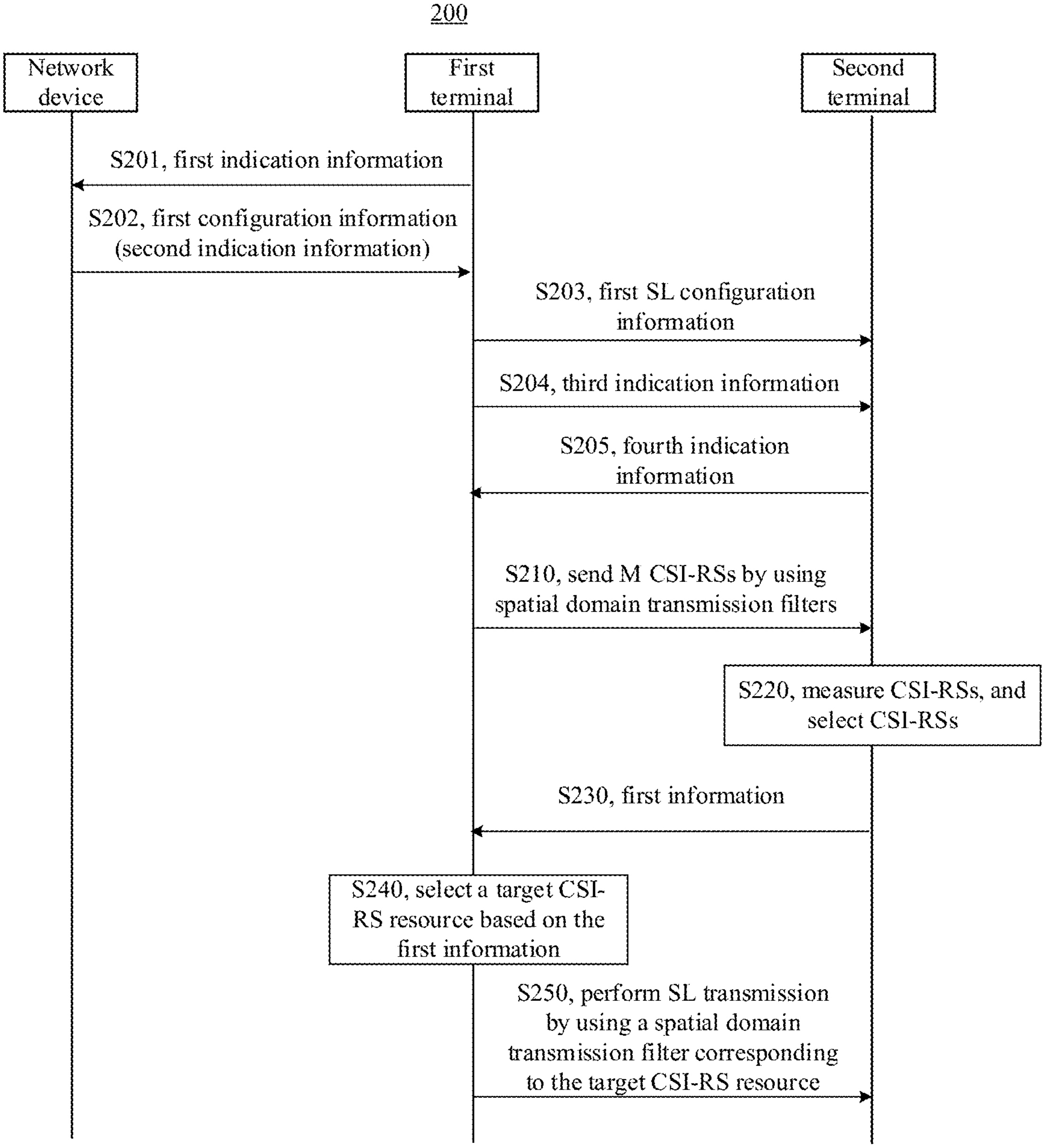
FIG. 11 is a schematic interaction diagram of a method for wireless communication according to an embodiment of the disclosure.

FIG. 11 is a schematic interaction diagram of a method 200 for wireless communication according to an embodiment of the disclosure. As shown in FIG. 11, the method 200 includes at least part of the following contents.

At S210, a first terminal device sends M CSI-RSs to a second terminal device by using spatial domain transmission filters, the M CSI-RSs being configured to select a target spatial domain transmission filter. The M CSI-RSs correspond to a plurality of CSI-RS resources in a target CSI-RS resource set, and M is a positive integer.

Correspondingly, the second terminal device may measure received CSI-RSs, obtain measurement results, and further perform CSI reporting or feedback according to the measurement results, so that the first terminal device may determine the target spatial domain transmission filter based on the CSI reporting or feedback.

In the embodiment of the disclosure, S210 may be replaced by an operation that a first terminal device sends M SL signals to a second terminal device by using spatial domain transmission filters, the M SL signals being configured to select a target spatial domain transmission filter.

In some embodiments, the SL signal may be for example a CSI-RS, a Demodulation Reference Signal (DMRS), a Positioning Reference Signal (PRS), a Phase Tracking Reference Signal (PT-RS), or a SL synchronization signal (including a primary SL synchronization signal and/or a secondary SL synchronization signal), etc. The DMRS may be a DMRS configured to demodulate a PSCCH, or a DMRS configured to demodulate a PSSCH. Hereinafter, descriptions are made by an example of taking an SL signal as a CSI-RS, however, the disclosure is not limited thereto.

In the embodiment of the disclosure, the first terminal device is a sending terminal, and the second terminal device is a receiving terminal.

In some embodiments, the spatial domain transmission filter may also be referred to as a transmitting beam or a spatial relation or a spatial setting.

In some embodiments, the spatial domain transmission filter and a spatial domain receiving filter are collectively referred to as a spatial domain filter, the spatial domain transmission filter may be referred to as a sending-end spatial domain filter, and the spatial domain receiving filter may be called a receiving-end spatial domain filter.

In the embodiment of the disclosure, sending CSI-RSs by the first terminal device may also be expressed as sending CSI-RS resources by the first terminal device, that is, the two expressions are equivalent expressions. Similarly, measurement results of CSI-RSs are equivalent to measurement results of CSI-RS resources.

In some embodiments of the disclosure, each of the M CSI-RSs corresponds to a CSI-RS resource in the target CSI-RS resource set, and correspondences between the M CSI-RSs and a plurality of CSI-RS resources in the target CSI-RS resource set may refer to that any two of the CSI-RS resources corresponding to the M CSI-RSs are different, that is, the M CSI-RSs and the plurality of CSI-RS resources are in one-to-one correspondence; or, at least two of the M CSI-RSs correspond to different CSI-RS resources. That is, the first terminal device sends at least two CSI-RS resources by using the spatial domain transmission filters.

In some embodiments, the operation of sending, by the first terminal device, the M CSI-RSs to the second terminal device by using the spatial domain transmission filters may refer to that the first terminal device uses different spatial domain transmission filters to send the M CSI-RSs, for example, the M CSI-RSs correspond to different transmitting beams respectively; or, the first terminal device does not use a same spatial domain transmission filter to send the M CSI-RSs, for example, uses at least two different transmitting beams to send the M CSI-RSs.

As an example, the operation of sending, by the first terminal device, the M CSI-RSs to the second terminal device by using the spatial domain transmission filters may include that:

the first terminal device sends the M CSI-RSs to the second terminal device by using M spatial domain transmission filters, and each spatial domain transmission filter corresponds to a CSI-RS.

As an example, the operation of sending, by the first terminal device, the M CSI-RSs to the second terminal device by using the spatial domain transmission filters may include that:

the first terminal device sends the M CSI-RSs to the second terminal device by using K spatial domain transmission filters, K is greater than 1 and less than M, that is, at least two of the M CSI-RSs are sent through different spatial domain transmission filters.

In the embodiment of the disclosure, the terminal device may perform SL data transmission by using beams. In this case, the sending terminal may determine a transmitting beam suitable for the receiving terminal to improve SL transmission performance. For example, when the first terminal device serves as the sending terminal, the first terminal device may send a SL reference signal through different transmitting beams. Furthermore, the receiving terminal may measure the SL reference signal sent by the sending terminal, select a transmitting beam corresponding to an optimal measurement result, and further feed back the optimal transmitting beam to the sending terminal, so that the sending terminal may perform subsequent SL transmission based on the optimal transmitting beam fed back by the receiving terminal, thereby improving transmission performance. In some embodiments, correspondences are present between transmitting beams and reference signal resources, the receiving terminal may select a transmitting beam corresponding to an optimal measurement result and feeds back reference signal resource information corresponding to the transmitting beam to the sending terminal, and the sending terminal may determine an optimal transmitting beam based on the reference signal resource information and the correspondences.

In some embodiments, a repetition field in configuration information of the target CSI-RS resource set may take a first value, and the first value is configured to indicate that the first terminal device does not use a same spatial domain transmission filter to send the CSI-RS resources in the target CSI-RS resource set, i.e., the first value is configured to indicate that the first terminal device uses different spatial domain transmission filters to send the CSI-RS resources in the target CSI-RS resource set.

In some embodiments, the first value may be 'off' which indicates that the first terminal device sends the M CSI-RSs to select the target spatial domain transmission filter.

In some embodiments of the disclosure, when the first terminal device operates in the first mode, the first terminal device may send CSI-RSs based on SL transmission resources allocated by a network device; when the first terminal device operates in the second mode, the first terminal device may determine transmission resources for sending CSI-RSs based on a listening result. Principles of the first mode and the second mode may refer to relevant descriptions of the foregoing embodiments.

In some embodiments, as shown in FIG. 11, the method 200 may further include the following operation.

At S201, the first terminal device sends first indication information to a network device, the first indication information is configured to indicate that the first terminal device requests the network device to allocate transmission resources for sending CSI-RSs.

In some embodiments, the first indication information may be carried in resource request information, and the resource request information is configured to request SL transmission resources from the network device.

For example, the first terminal device may operate in the first mode, and when the first terminal device determines that the first terminal device needs to send CS-RSs to determine an optimal transmitting beam, the first terminal device may send the resource request information to the network device, and the first indication information may be carried in the resource request information.

Optionally, the first terminal device needs to send CS-RSs, which may mean that the first terminal device needs to send a plurality of CSI-RSs, or the first terminal device needs to send CSI-RSs through different transmitting beams.

In some embodiments, the first terminal device may periodically send CSI-RSs, so that the second terminal device performs periodic measurement. Therefore, the first indication information may be configured to indicate that the first terminal device needs to periodically send CSI-RSs, or the first terminal device requests periodic SL resources.

Optionally, the first indication information may further include period information for the first terminal device to send CSI-RSs. Therefore, the network device may allocate periodic SL resources to the first terminal device according to the first indication information.

In some embodiments, the first indication information may further include a value of M. The value of M is indicated to the network device, so that the network device may allocate corresponding SL transmission resources for the first terminal device to send the M CSI-RSs respectively.

In some embodiments, the resource request information may include, but is not limited to at least one of a Scheduling Request (SR) or a Buffer Status Report (BSR).

It should be understood that the first indication information may be sent through any uplink channel or signaling, examples of which are a Physical Uplink Control Channel (PUCCH), uplink RRC signaling, etc.

Furthermore, in some embodiments, as shown in FIG. 11, the method may further include the following operation.

At S202, the first terminal device receives first configuration information from the network device, the first configuration information including the transmission resources allocated by the network device to the first terminal device for sending CSI-RSs.

In some embodiments, the first configuration information may include second indication information. The second indication information is configured to indicate that the SL transmission resources allocated by the network device are configured to send CSI-RSs configured to select the target spatial domain transmission filter; or, the second indication information is configured to indicate that the SL transmission resources allocated by the network device are configured for the first terminal device to send CSI-RSs.

In some embodiments, the network device may allocate the SL transmission resources to the first terminal device by way of dynamic resource allocation, or allocation of a SL Configure Grant (CG), etc.

The operation of allocating, by the network device, the SL transmission resources of the SL CG to the first terminal device may be that the network device allocates periodic SL transmission resources to the first terminal device. In this way, the first terminal device may periodically send CSI-RSs to the second terminal device by using periodic resources of the SL CG.

In some embodiments, when the network device allocates the periodic resources of the SL CG to the first terminal device, there may be only one SL transmission resource included in each period.

In some embodiments, the network device may allocate the SL transmission resources to the first terminal device through DCI, and in this case, the allocated SL resources are dynamic resources.

In some other embodiments, the network device may allocate the SL transmission resources to the first terminal device through RRC signaling, and in this case, the allocated SL resources may be Type-1 SL CG.

In some other embodiments, the network device may allocate the SL transmission resources to the first terminal device through RRC signaling and DCI, and in this case, the allocated SL resources may be Type-2 SL CG.

In some embodiments, the second indication information may be carried by at least one of DCI or RRC signaling.

It should be understood that the manners by which the second indication information is carried in signaling are not limited in the embodiments of the disclosure. When the second indication information is carried by DCI, the second indication information may be carried in an information field of the DCI, for example, the second indication information may be carried in the DCI by adding a new information field or multiplexing an existing information field; or, the second indication information may be carried by a Radio Network Temporary Identity (RNTI) generating a scrambling code sequence which scrambles information bits of the DCI.

In some embodiments of the disclosure, the first terminal device may determine the target CSI-RS resource set based on resource pool configuration information or a first CSI-RS resource set included in SL BWP configuration information, and determine CSI-RS resources included in the target CSI-RS resource set based on CSI-RS resources included in the first CSI-RS resource set.

In some embodiments, the resource pool configuration information or the SL BWP configuration information may include CSI-RS resource set configuration information (CSI-RS-ResourceSet) and/or CSI report configuration information.

In some embodiments, the CSI-RS resource set configuration information may include one or more of:

- CSI-RS resource set ID (CSI-RS-ResourceSetId);
- CSI-RS resource configuration information (CSI-RS-Resource);
- configuration information of parameter repetition, a value of which for example is off or on;
- the number of time domain symbols occupied by a CSI-RS resource;
- indication information configured to determine a time domain symbol where a first CSI-RS resource is located, for example a time-domain symbol index in a slot; and
- indication information configured to determine a Resource Element (RE) or subcarrier where a CSI-RS resource in a PRB is located, for example, a position of a RE where a first CSI-RS in the PRB is located is indicated by parameter SL CSI-RS frequency allocation (sl-CSI-RS-FreqAllocation) in form of a bitmap.

When the sending terminal sends indication information to the receiving terminal to indicate that CSI-RS resources in a CSI-RS resource set whose repetition is off are about to be sent, the receiving terminal may assume that the sending terminal does not use the same transmitting beam to send the CSI-RS resources. Therefore, the receiving terminal may perform measurement based on CSI-RSs, and perform CSI reporting or feedback to the sending terminal, so that the first terminal device may determine a target transmitting beam based on the CSI reporting or feedback.

When the sending terminal indicates to the receiving terminal that CSI-RS resources in a CSI-RS resource set whose repetition is on are sent, the receiving terminal may assume that the sending terminal uses the same transmitting beam to send the CSI-RS resources. Therefore, the receiving terminal may use different receiving beams for reception, measure CSI-RSs, and determine a receiving beam according to measurement results.

In some embodiments, the CSI report configuration information may include one or more of:

- CSI report configuration ID (CSI-ReportConfigId);
- CSI report quantity (reportQuantity); or
- CSI-RS resource set ID (CSI-RS-ResourceSetId), configured to associate a CSI-RS resource set with CSI report quantity.

It should be understood that the CSI report quantity may include indication information of CSI-RS resources selected to be reported by the receiving terminal and/or measurement results of CSI-RS resources selected to be reported by the receiving terminal.

In some embodiments, the indication information of CSI-RS resources may be direct indication information of the CSI-RS resources, such as resource indexes of the CSI-RS resources; or, may be indirect indication information of the CSI-RS resources, such as transmission resource information corresponding to the CSI-RS resources, etc. It should be understood that the transmission resource information corresponding to the CSI-RS resources may indicate resource information for transmitting the CSI-RS resources, such as slot information for transmitting the CSI-RS resources.

In some embodiments, the measurement results of CSI-RS resources may include, but are not limited to at least one of Reference Signal Receiving Power (RSRP), Reference Signal Receiving Quality (RSRQ), or Signal to Interference plus Noise Ratio (SINR).

As an example, the CSI report quantity may include, but is not limited to at least one of followings: CSI-RS Resource Indicator (CRI); CRI and RSRP ('cri-RSRP'); CRI and SINR ('cri-SINR'); slot indicator; slot indicator and RSRP; slot indicator and SINR; or no report or empty ('none').

In some embodiments, the CRI may be a resource index of a CSI-RS resource.

In some embodiments, the slot indicator may be configured to indicate slot information corresponding to a CSI-RS resource selected by the receiving terminal which receives CSI-RS resources. For example, the first terminal device sends a CSI-RS resource in a slot, and when the second terminal device receives the CSI-RS resource, the second terminal device may know slot information of the CSI-RS resource sent by the first terminal device; when the second terminal device chooses to report or feed back the CSI-RS resource, the second terminal device may feed back the slot information corresponding to the CSI-RS resource. In this way, the first terminal device may determine the CSI-RS resource corresponding to the slot information based on the slot information.

In some embodiments, the resource pool configuration information or the SL BWP configuration information may further include at least one of: the number of antenna ports, for example, the number of antenna ports indicating CSI-RSs is {1,2,4,8}, etc.; or CSI-RS density.

In some embodiments, the CSI-RS density is configured to indicate the number of REs occupied by a CSI-RS on each antenna port in each PRB. When the density is 2, it indicates that in each PRB, two REs are occupied by the CSI-RS on each antenna port.

In some embodiments, when the CSI-RS density is less than 1, the resource pool configuration information or the SL BWP configuration information may further include PRB information configured to indicate mapping of a CSI-RS resource. For example, when the density is 0.5, that is, when each antenna port occupies a RE in every two PRBs, the resource pool configuration information or the SL BWP configuration information may further include PRB information mapping a CSI-RS resource in every two PRBs, such as mapping the CSI-RS resource on an odd (or even) PRB.

In some embodiments of the disclosure, a value of a repetition field of a CSI-RS resource set may indicate usage of the CSI-RS resource set, for example, indicating whether the CSI-RS resource set is configured to determine a target transmitting beam or a target receiving beam.

For example, when a target sending beam needs to be determined, the sending terminal may use a CSI-RS resource set whose repetition is off, and when a target receiving beam needs to be determined, the sending terminal may use a CSI-RS resource set whose repetition is on.

In some embodiments, the resource pool configuration information or the SL BWP configuration information may include configuration information of the first CSI-RS resource set and configuration information of a second CSI-RS resource set. Repetition of the first CSI-RS resource set is off, and repetition of the second CSI-RS resource set is on.

Then, when a target transmitting beam needs to be determined, the first terminal device may use the first CSI-RS resource set, for example, the first terminal device may use different transmitting beams to send M CSI-RS resources in the first CSI-RS resource set respectively, the second terminal device may measure received CSI-RS resources respectively and perform CSI reporting or feedback according to measurement results, and the first terminal device may select the target transmitting beam based on the CSI reporting or feedback of the second terminal device.

When a target receiving beam needs to be determined, the first terminal device may use the second CSI-RS resource set, for example, the first terminal device may use a same transmitting beam to send M CSI-RS resources in the second CSI-RS resource set respectively, and the second terminal device may use different receiving beams for reception respectively, measure CSI-RS resources and select the target receiving beam according to measurement results.

In some other embodiments, configuration of CSI report quantity corresponding to a CSI-RS resource set may indicate usage of the CSI-RS resource set, for example, indicating whether the CSI-RS resource set is configured to determine a target transmitting beam or a target receiving beam. For example, when a target transmitting beam needs to be determined, the sending terminal may use a CSI-RS resource set whose CSI report quantity is not 'none', and when a target receiving beam needs to be determined, the sending terminal may use a CSI-RS resource set whose CSI report quantity is 'none'.

For example, two CSI-RS resource sets and CSI reporting quantity associated with the two CSI-RS resource sets are configured by the resource pool configuration information or the SL BWP configuration information, the CSI report quantity associated with the first CSI-RS resource set is 'cri-RSRP', and the CSI report quantity associated with the second CSI-RS resource set is 'none'.

Then, when the first terminal device indicates to the second terminal device that the CSI report quantity is 'cri-RSRP', it indicates that the first terminal device will send CSI-RS resources in the first CSI-RS resource set. In this case, the second terminal device may assume that the first terminal device uses different transmitting beams to send the CSI-RS resources. Therefore, the second terminal device measures the CSI-RS resources and performs CSI reporting or feedback, so that the first terminal device may determine a target transmitting beam based on the CSI reporting or feedback.

When the first terminal device indicates to the second terminal device that the CSI report quantity is 'none', it indicates that the first terminal device will send CSI-RS resources in the second CSI-RS resource set. In this case, the second terminal device may assume that the first terminal device uses a same transmitting beam to send the CSI-RS resources. Therefore, the second terminal device may use different receiving beams to receive the CSI-RS resources respectively, measures the CSI-RS resources and selects a target receiving beam according to measurement results.

In the embodiments, both the first terminal device and the second terminal device may know the resource pool configuration information or the SL BWP configuration information. That is, the first terminal device and the second terminal device have same understanding on the CSI-RS resource configuration information.

In some embodiments, when the first terminal device sends CSI-RSs to the second terminal device by using the spatial domain transmission filters, the first terminal device may carry CSI-RS resource indication information corresponding to the CSI-RSs in Sidelink Control Information (SCI) associated with the CSI-RSs.

For example, each time when the first terminal device sends CSI-RSs to the second terminal device by using the spatial domain transmission filters, the first terminal device may carry CRI information corresponding to the CSI-RSs in the SCI associated with the CSI-RSs, such as index information of CSI-RS resources.

That is, the first terminal device may indicate CSI-RS resources corresponding to the CSI-RSs to the second terminal device through the SCI associated with the CSI-RSs.

In some embodiments, as shown in FIG. 11, the method 200 may further include the following operations.

At S203, the first terminal device sends first SL configuration information to the second terminal device.

In some embodiments, the first SL configuration information is configured to indicate at least one of followings: CSI-RS resource sending configuration, CSI-RS resource receiving configuration, or CSI-RS resource reporting or feedback configuration.

That is, based on the first SL configuration information, the second terminal device may know configuration used by the sending terminal to send CSI-RS resources and/or configuration used by the receiving terminal to receive CSI-RS resources, and/or configuration used by the receiving terminal to perform CSI reporting or feedback.

Therefore, the first terminal device sends the first SL configuration information to the second terminal device, so that the second terminal device may know sending configuration and/or receiving configuration of CSI-RSs, may further detect and measure CSI-RS resources based on the sending configuration and/or receiving configuration, and select CSI-RS resources to be reported or fed back according to measurement results in combination with reporting or feedback configuration, to implement a process of selecting a target transmitting beam.

In some embodiments, the first SL configuration information may include, but is not limited to at least one of followings: an index of the target CSI-RS resource set; indexes of CSI-RS resources included in the target CSI-RS resource set; the number of the CSI-RS resources included in the target CSI-RS resource set; a value of M; correspondences between a CSI-RS resource set and CSI report quantity; the number of CSI-RS resources reported or fed back by the second terminal device to the first terminal device; a latency boundary; a value of a repetition field corresponding to the target CSI-RS resource set; transmission resource information configured for the first terminal device to send the M CSI-RSs; resource pool information corresponding to transmission resources used for the M CSI-RSs; or a transmission mode of the first terminal device.

The repetition field corresponding to the target CSI-RS resource set may take a first value to indicate that the first terminal device does not use a same spatial domain transmission filter to send CSI-RSs, and the repetition field corresponding to the target CSI-RS resource set may take a second value to indicate that the first terminal device uses the same spatial domain transmission filter to send CSI-RSs.

It should be understood that the first SL configuration information may be configured through any SL information or SL signaling. As an example, the first SL configuration information may be carried by SCI, or Media Access Control Control Element (MAC CE), or PC5-RRC signaling.

In some implementations, when the first SL configuration information is carried by SCI or MAC CE, the first terminal device indicates activation of SL feedback.

The first terminal device may indicate the index of the target CSI-RS resource set to the second terminal device, so that the second terminal device may know the CSI-RS resource set that includes CSI-RS resources to be sent by the first terminal device. Furthermore, it may be determined, in combination with the value of the repetition field corresponding to the target CSI-RS resource set or the CSI report quantity, whether CSI-RS resources in the target CSI-RS resource set are configured to determine a target transmitting beam or a target receiving beam. For example, when the target CSI-RS resource set is configured to determine the target transmitting beam, the second terminal device may use the same receiving beam to receive CSI-RS resources from the first terminal device. For another example, when the target CSI-RS resource set is configured to determine the target receiving beam, the second terminal device may use different receiving beams to receive CSI-RS resources from the first terminal device.

In some embodiments, the indexes of CSI-RS resources included in the target CSI-RS resource set may be indexes of all the CSI-RS resources included in the target CSI-RS set, or indexes of CSI-RS resources actually sent by the first terminal device, such as indexes of a plurality of CSI-RS resources corresponding to the M CSI-RSs.

The first terminal device may indicate the indexes of CSI-RS resources included in the target CSI-RS resource set to the second terminal device, so that the second terminal device may know CSI-RS resources to be sent (or possibly sent) by the first terminal device, and may further measure and report the CSI-RS resources.

In some embodiments, the value of the repetition field corresponding to the target CSI-RS resource set may be used for the second terminal device to determine whether CSI-RS resources to be sent by the first terminal device are configured to determine a target transmitting beam or a target receiving beam. Furthermore, detection and measurement of the CSI-RS resources may be performed in a corresponding manner. For example, when the value of the repetition field corresponding to the target CSI-RS resource set is the first value (for example, the value is off), the second terminal device may use the same receiving beam to receive CSI-RS resources from the first terminal device. For another example, when the value of the repetition field corresponding to the target CSI-RS resource set is the second value (for example, the value is on), the second terminal device may use different receiving beams to receive CSI-RS resources from the first terminal device.

In some embodiments, the first SL configuration information may further include at least one of CSI-RS resource sets in the resource pool configuration information or the SL BWP configuration information.

For example, A CSI-RS resource sets may be configured by the resource pool configuration information or the SL BWP configuration information, and each CSI-RS resource set may include at least one CSI-RS resource, A being a positive integer. Then, the first SL configuration information may include at least one of the A CSI-RS resource sets.

Furthermore, the first SL configuration information may further include at least one CSI-RS resource in each of the at least one CSI-RS resource set.

It should be understood that the number of CSI-RS resources in each CSI-RS resource set included in the first SL configuration information may be the same or different. For example, the first SL configuration includes P resources in the first CSI-RS resource set and Q resources in the second CSI-RS resource set, P may be the same as or different from Q.

For example, A CSI-RS resource sets may be configured by the resource pool configuration information, the sending terminal may send the first SL configuration information to the receiving terminal, the first SL configuration information may include indexes of CSI-RS resource sets, and the receiving terminal may determine a CSI-RS resource set based on the indexes of the CSI-RS resource sets. In the resource pool configuration information, the CSI-RS resource set may include B CSI-RS resources, the sending terminal may select K CSI-RS resources from the CSI-RS resource set and send information of the K CSI-RS resources to the receiving terminal, CSI-RS resources subsequently sent by the sending terminal belonging to the K CSI-RS resources, 1<=K<=B, and B being a positive integer. For example, the CSI-RS resource set may include 16 CSI-RS resources, and when the transmitting beam of the sending terminal needs to be determined, a maximum number of transmitting beams supported by the sending terminal may be 4. In this case, the sending terminal may select 4 CSI-RS resources from the 16 CSI-RS resources included in the CSI-RS resource set, and send information of the 4 CSI-RS resources to the receiving terminal, so that the sending terminal and the receiving terminal have same understanding on the transmission configuration of CSI-RS resources. When the receiving terminal reports or feeds back CSI-RS resources to the sending terminal, the receiving terminal may report resource index information corresponding to the CSI-RS resources. For example, CSI-RS resource indexes may be represented by 2 bits, 00 corresponds to a CSI-RS resource with the lowest index in the CSI-RS resource set, 01 corresponds to a CSI-RS resource with the second lowest index in the CSI-RS resource set, and so on.

In some embodiments, the number of the CSI-RS resources included in the target CSI-RS resource set may indicate the number of all the CSI-RS resources included in the target CSI-RS set, or the number of CSI-RS resources actually sent by the first terminal device, such as the number of CSI-RS resources corresponding to the M CSI-RSs.

The first terminal device may indicate the number of the CSI-RS resources included in the target CSI-RS resource set or the value of M to the second terminal device, so that the second terminal device may determine a bit length corresponding to each CSI-RS resource index when CSI reporting or feedback is performed, based on the number of the CSI-RS resources included in the target CSI-RS resource set or the value of M.

The first terminal device indicating the value of the parameter M to the second terminal device is taken as an example, a bit length for feeding back a CSI-RS resource index may be ceil($\log_2 M$).

In some embodiments, the first terminal device may also configure a correspondence between a CSI-RS resource set and CSI report quantity for the second terminal device. For example, CSI report configuration information (CSI-ReportConfig) may include CSI-RS resource set ID information (CSI-RS-ResourceSetId) or CSI-RS resource configuration ID information (CSI-ResourceConfigId) to associate CSI report quantity with a CSI-RS resource set. For another example, CSI report configuration ID information (CSI-ReportConfigId) may be included in CSI-RS resource set configuration information (CSI-RS-ResourceSet) or CSI-RS resource configuration information (CSI-ResourceConfig). Manners of associating the two items are not limited in the embodiments of the disclosure.

In some embodiments, the latency boundary may take a first slot as reference, for example, the first slot may be a slot where the first SL configuration information is located. For example, the latency boundary may be a slot offset, and the slot offset is an offset relative to the slot where the first SL configuration information is located.

In some embodiments, within the latency boundary, the first terminal device does not expect the second terminal device to perform reporting or feedback of CSI-RS resources. In other words, the first terminal device does not expect the second terminal device to perform CSI reporting or feedback within the latency boundary.

In some embodiments, after exceeding the latency boundary, the second terminal device is allowed to perform reporting or feedback of CSI-RS resources. In other words, after exceeding the latency boundary, the second terminal device may perform CSI reporting or feedback.

In some embodiments, after exceeding the latency boundary, the second terminal device does not expect the first terminal device to send CSI-RS resources configured to determine the spatial domain transmission filter.

In some embodiments, after exceeding the latency boundary, the second terminal device stops receiving CSI-RS resources configured to determine the spatial domain transmission filter from the first terminal device. In other words, after exceeding the latency boundary, the first terminal device stops sending the CSI-RS resources configured to determine the spatial domain transmission filter.

In some scenarios, the second terminal device may not know the number of transmitting beams configured for the first terminal device or quantity of CSI-RS resources to be sent by the first terminal device (for example, the sending terminal does not send the value of M to the receiving terminal), and in this case, the second terminal device may determine, based on the latency boundary, time for performing CSI-RS measurement and feedback. For example, when the latency boundary is exceeded, it indicates that the first terminal device does not send CSI-RSs any more, and in this case, the second terminal device may perform measurement and feedback based on detected CSI-RSs.

As shown in FIG. 12 and FIG. 13, the first terminal device uses four transmitting beams (transmitting beam 0 to transmitting beam 3) to send CSI-RS resources respectively, the first terminal device sends the first SL configuration information to the second terminal device at slot 0, a latency boundary indicated by the first SL configuration information includes 10 slots, that is, the first terminal device sends CSI-RS resources in turn before slot 10, and the second terminal device performs CSI-RS reporting or feedback after slot 10.

The transmission resource information configured for the first terminal device to send the M CSI-RSs is configured to indicate transmission resources configured for the first terminal device to send the M CSI-RSs.

For example, the network device may allocate transmission resources on four slots including slot 3, slot 5, slot 6 and slot 8 to the first terminal device, and the first terminal device may send CSI-RS resources on the four slots respectively, and use different transmitting beams on different slots to send CSI-RS resources.

Then, the first SL configuration information may include transmission resources on slot 3, slot 5, slot 6 and slot 8, and after receiving the first SL configuration information, the second terminal device may perform CSI-RS detection and measurement on the transmission resources of the four slots, and perform CSI reporting or feedback after slot 10, for example, in slot 12.

In some embodiments, the transmission resource information configured for the first terminal device to send the M CSI-RSs may be configured by the network device, or may be autonomously selected.

For example, the transmission resource information configured for the first terminal device to send the M CSI-RS resources may be configured by the network device through the foregoing first configuration information.

Optionally, the transmission resource information configured for the first terminal device to send the M CSI-RSs may be a periodic transmission resource or a single-use transmission resource, which is not limited in the disclosure.

The first terminal device may send transmission resources configured to send CSI-RSs to the second terminal device, so that the second terminal device may know the transmission resources on which the first terminal device will send the CSI-RSs, and thus may receive the CSI-RSs on the transmission resources.

In some embodiments, the transmission resource information configured for the first terminal device to send the M CSI-RSs may include period information and/or transmission resource information within a period.

In some embodiments, when the sending terminal operates in the second mode, the sending terminal may obtain SL transmission resources by listening. However, re-evaluation, pre-emption or other mechanisms may cause the sending terminal to perform resource reselection when SL transmission resources selected by the sending terminal are occupied by other terminals. In this case, the receiving terminal cannot accurately know transmission resources selected by the sending terminal. Furthermore, CSI-RSs sent by the sending terminal may be not received by the receiving terminal. For example, the receiving terminal cannot detect CSI-RSs sent on the transmitting beam due to half-duplex, SCI detection failure, non-alignment between the transmitting beam and the receiving terminal, or other reasons, therefore the receiving terminal may not obtain all the CSI-RSs sent by the sending terminal. When the sending terminal operates in the first mode, SL transmission resources of the sending terminal are allocated by the network device, and the SL transmission resources are usually not pre-empted by other terminals. In this case, the sending terminal may send, to the receiving terminal, SL transmission resources allocated by the network device for the sending terminal to send CSI-RSs, so that the receiving terminal may know the transmission resources for the sending terminal to send CSI-RSs, and may further perform CSI-RS detection and measurement on these transmission resources.

In some embodiments, the system may configure a plurality of resource pools, and the network device may allocate SL transmission resources in the plurality of resource pools for the first terminal device operating in the first mode. In this case, when the first terminal device indicates transmission resource information for sending CSI-RSs to the second terminal device, resource pool information corresponding to the transmission resource information may be notified to the second terminal device, so that the second terminal device may determine the resource pool which includes transmission resources the transmission resource information corresponds to.

In some embodiments, the resource pool information corresponding to transmission resources used for the M CSI-RSs may be index information corresponding to the resource pool.

In some embodiments, the first terminal device may indicate the transmission mode of the first terminal device (such as the first mode) to the second terminal device, the second terminal device may consider that transmission resources of the first terminal device may not change. Even though the second terminal device does not detect SCI on the transmission resources indicated by the first terminal device, the second terminal device may measure CSI-RS resources on the transmission resources. It is beneficial to ensure that the second terminal device may obtain measurement results of all the CSI-RSs sent by the first terminal device, and can avoid a situation that the second terminal device does not detect SCI correctly and accordingly cannot know receiving configurations of the CSI-RSs and cannot perform corresponding measurements.

It should be understood that contents indicated by the first SL configuration information may be sent through a same message or signaling or through different messages or signaling, which is not limited in the disclosure.

It should be noted that when the contents indicated by the first SL configuration information are sent through different signaling, an order of sending the signaling is not limited in the disclosure.

It should be noted that when the contents indicated by the first SL configuration information are sent through different signaling, types of the signaling are not limited in the disclosure. For example, the first SL configuration information may be sent through two signaling, the first signaling may be PC5-RRC signaling, and the second signaling may be SCI, or, both signaling may be PC5-RRC signaling.

In some embodiments, as shown in FIG. 11, the method 200 may further include the following operations.

At S204, the first terminal device sends third indication information to the second terminal device.

The third indication information is configured to indicate at least one of followings: the first terminal device being about to send CSI-RSs configured to select the target spatial domain transmission filter; the first terminal device being about to use different spatial domain transmission filters to send CSI-RSs; CSI report quantity; an index of a first CSI-RS resource sent by the first terminal device; or a time gap for the first terminal device to send the first CSI-RS resource. The time gap may take a time unit where the third indication information is located as reference.

It should be understood that the third indication information may be configured through any SL information or SL signaling. The third indication information may be carried by PC5-RRC signaling, or SCI, MAC CE, or SL feedback information, such as PSFCH.

In some implementations, when the third indication information is carried by SCI or MAC CE, the first terminal device may indicate activation of SL feedback.

In some embodiments, before sending CSI-RSs, the first terminal device may notify the second terminal device that the first terminal device is about to send CSI-RSs, or the first terminal device is about to CSI-RSs configured to select the target spatial domain transmission filter, or the first terminal device is about to use different spatial domain transmission filters to send CSI-RSs, so that the second terminal device may measure and report CSI-RS resources based on at least one of sending configuration, receiving configuration or report configuration of the CSI-RSs, to achieve a process of selecting the target transmitting beam.

It should be understood that the sending configuration, receiving configuration and report configuration of the CSI-RSs may be configured in the first SL configuration information or the third indication information. For example, when the first terminal device needs to send CSI-RSs, the first terminal device may send the third indication information to the second terminal device, the third indication information is configured to indicate at least one of the sending configuration, receiving configuration or report configuration of the CSI-RSs.

That is, part or all of the first SL configuration information may be indicated by the third indication information. In other words, contents indicated by the first SL configuration information and the third indication information may be carried by the same signaling or different signaling.

In some embodiments, the first terminal device may send CSI-RS resources in a certain order, starting from a CSI-RS resource corresponding to a resource index of a first transmitted CSI-RS resource. Correspondingly, the second terminal device receives CSI-RS resources in a certain order, starting from the CSI-RS resource corresponding to the resource index of the first transmitted CSI-RS resource. The order may be an order from small to large resource indexes or an order from large to small resource indexes.

For example, the target CSI-RS resource set may include eight CSI-RS resources, and when the index of the first transmitted CSI-RS resource is resource index 2, it indicates that the first terminal device may send CSI-RS resources sequentially starting from a CSI-RS resource corresponding to the CSI-RS resource index 2, that is, sending the CSI-RS resource corresponding to the CSI-RS resource index 2 at first, then sending a CSI-RS resources corresponding to CSI-RS resource index 3, and so on. After the first terminal device finishes sending a CSI-RS resource corresponding to CSI-RS resource index 7, the first terminal device sends a CSI-RS resource corresponding to CSI-RS resource index 0 and a CSI-RS resource corresponding to CSI-RS resource index 1.

When the second terminal device knows an order of CSI-RS resources to be sent by the first terminal device and transmission resources of CSI-RSs to be sent by the first terminal device, even though the second terminal device does not receive SCI sent on the transmission resources correctly, the second terminal device may detect and measure CSI-RSs on the transmission resources, which is beneficial to ensure that the second terminal device obtains measurement results of all the CSI-RSs sent by the first terminal device, and may avoid a situation that the second terminal device does not detect SCI correctly and accordingly cannot know the receiving configuration of the CSI-RSs and cannot perform corresponding measurements.

In some embodiments, when the first terminal device does not send index information of the first transmitted CSI-RS resource to the second terminal device, the first terminal device may start sending from a first CSI-RS resource index in the CSI-RS resource set (such as resource index 0 or a CSI-RS resource corresponding to the lowest resource index) by default.

It should be understood that specific implementation of the CSI report quantity in the third indication information refers to relevant descriptions of the foregoing embodiments, which are not elaborated here for the sake of brevity.

In some embodiments, the time gap for the first terminal device to send the first CSI-RS resource may take a time unit where the third indication information is located as reference. After receiving the third indication information of the first terminal device, the second terminal device may know the time unit of the third indication information and the time gap, so that a time unit for the first terminal device to send the first CSI-RS resource may be determined, and CSI-RS resources may be received at the time unit.

As an example, the third indication information may be configured to indicate a slot interval for the first terminal device to send the first CSI-RS resource, and the slot interval may take a slot where the third indication information is located as reference.

It should be understood that each information indicated by the third indication information may be sent through a same message or signaling or through different messages or signaling.

In some embodiments, as shown in FIG. 11, the method 200 may further include the following operation.

At S205, the first terminal device sends fourth indication information to the second terminal device.

The fourth indication information is configured to indicate that CSI-RSs sent by the first terminal device are configured to select a spatial domain transmission filter configured for the first terminal device to transmit SL data; or, the fourth indication information is configured to indicate that the CSI-RSs sent by the first terminal device are configured to select a spatial domain receiving filter used for the second terminal device to receive SL data; or, the fourth indication information is configured to indicate that the CSI-RSs sent by the first terminal device are configured to measure CSI.

It should be understood that the fourth indication information may be configured through any SL information or SL signaling. The fourth indication information may be carried by PC5-RRC signaling, or SCI, or MAC CE, or SL feedback information, such as PSFCH.

In some implementations, when the fourth indication information is carried by SCI or MAC CE, the first terminal device may indicate activation of SL feedback.

In some embodiments, the CSI may include, but is not limited to at least one of a Channel Quantity Indicator (CQI), a Rank Indication (RI), or a Precoding Matrix Indicator (PMI).

In some embodiments, the third indication information may be configured to indicate that the first terminal device is about to send CSI-RS resources; furthermore, the first terminal device may indicate usage of the CSI-RS resources to be sent by first terminal device through the fourth indication information, for example, the usage may be determination of a target transmitting beam or a target receiving beam, so that the second terminal device may detect and feed back the CSI-RS resources in a corresponding manner based on the fourth indication information. For example, when CSI-RS resources sent by the first terminal device are configured to select a target transmitting beam, the second terminal device may use a same receiving beam to receive the CSI-RS resources from the first terminal device. For another example, when CSI-RS resources sent by the first terminal device are configured to select a target receiving beam, the second terminal device may use different receiving beams to receive the CSI-RS resources from the first terminal device.

In some embodiments, as shown in FIG. 11, the method 200 may further include the following operations.

At S220, the second terminal device measures CSI-RSs sent by the first terminal device, and determines first information to be reported or fed back to the second terminal device according to measurement results.

At S230, the second terminal device sends the first information to the first terminal device.

Correspondingly, the first terminal device receives first information from the second terminal device.

The first information may include target CSI report quantity, and the target CSI report quantity including at least one of followings: CRI; CRI and RSRP; CRI and SINR, slot indicator; slot indicator and RSRP; or slot indicator and SINR.

Slot indicator information is configured to determine slots corresponding to CSI-RSs sent by the first terminal device; or, the slot indicator information is configured to determine indexes corresponding to CSI-RS resources sent by the first terminal device.

In some embodiments, the operation of receiving, by the first terminal device, the first information from the second terminal device may include that:

the first terminal device receives the first information from the second terminal device in a first time unit, the first time unit being located after a second time unit determined based on a latency boundary.

In some embodiments, the CRI may be an index of a CSI-RS resource. For example, in a case that CSI report quantity indicated by the first SL configuration information or the third indication information is CRI, the second terminal device may only feed back an index of the CSI-RS resource. For another example, in a case that the CSI report quantity indicated by the first SL configuration information or the third indication information is CRI-RSRP, the second terminal device may feed back an index of the CSI-RS resource and RSRP. For another example, in a case that the CSI report quantity indicated by the first SL configuration information or the third indication information includes CRI-SINR, the second terminal device may feed back an index of the CSI-RS resource and SINR.

In some embodiments, the CSI-RS resource may also be indicated by a slot resource, a specific indication manner thereof refers to relevant descriptions of the foregoing embodiments.

In some embodiments, the target CSI report quantity may be determined by the second terminal device according to measurement results obtained by measuring received CSI-RSs.

In some embodiments, the measurement results (including RSRP and/or SINR) in the disclosure may be obtained based on measurement of CSI-RSs. In some other implementations, the measurement results may be obtained based on measurement of PSCCH DMRS, PSSCH DMRS or SL PT-RS. In some implementations, CSI-RSs sent by the sending side may be carried in a PSSCH, that is, the CSI-RSs are mapped in a PSSCH resource, the PSSCH is scheduled and CSI-RS transmission is indicated through SCI. In this case, in each CSI-RS transmission, there is a PSCCH and a PSSCH associated with the CSI-RS transmission. Therefore, the receiving terminal may perform measurement based on the PSCCH DMRS or PSSCH DMRS. That is, CSI-RS resources may also be determined based on measurement results of the PSCCH DMRS or PSSCH DMRS associated with the CSI-RSs.

In some embodiments, the sending terminal may indicate transmission of CSI-RSs through indication information, and the receiving terminal may measure PSCCH DMRS or PSSCH DMRS associated with the CSI-RSs, the measurement results being PSCCH-RSRP or PSSCH-RSRP; the receiving terminal may determine CSI-RS resources based on the measurement results, and send indexes of the CSI-RS resources or the indexes of the CSI-RS resources and associated measurement results (i.e., PSCCH-RSRP or PSSCH-RSRP) to the sending terminal, to assist the sending terminal in selecting the spatial domain transmission filter.

It should be understood that in the following embodiments, descriptions are made by an example of taking measurement results obtained based on CSI-RSs as the measurement results, and the embodiments of the disclosure are also applicable to a case where the measurement results are measurement results obtained based on the PSCCH DMRS or PSSCH DMRS.

In some embodiments, the first information may include indexes of N CSI-RS resources; or, the first information is configured to determine the indexes of the N CSI-RS resources, the N CSI-RS resources may be determined by the second terminal device according to measurement results obtained by measuring received CSI-RSs, N representing quantity of CSI-RS resources required to be fed back or reported by the second terminal device, N being a positive integer, and $N \le M$.

In some embodiments, the second terminal device may send a piece of indication information to the first terminal device, to indicate the number of CSI-RS resource information (or CSI-RS resource indexes) fed back by the second terminal device.

In some embodiments, the indexes of the N CSI-RS resources may be arranged in a descending order of measurement results corresponding to the N CSI-RS resources; or, the indexes of the N CSI-RS resources may be arranged in an ascending order of the measurement results corresponding to the N CSI-RS resources.

As an example, N=1, that is, the second terminal device only needs to feed back one CSI-RS resource index. In this case, the second terminal device only needs to feed back a CSI-RS with an optimal measurement result. The first terminal device may determine according to the CSI-RS resource index that a transmitting beam corresponding to the CSI-RS resource index is the target transmitting beam. Optionally, when N=1, the second terminal device does not need to feed back measurement results. Optionally, when N is greater than 1, the second terminal device may also only feed back CSI-RS resource information, and in this case, the CSI-RS resource information fed back may be arranged in a descending order of measurement results. For example, N=3, that is, three CSI-RS resource information, namely CSI-RS resource 1, CSI-RS resource 2, and CSI-RS resource 3 need to be fed back, and RSRP measurement results corresponding thereto are −30 dBm, −10 dBm, −20 dBm respectively. The CSI-RS resource information fed back is shown in FIG. 14, that is, a CSI-RS resource with an optimal measurement result is at the foremost, followed by a CSI-RS resource with a suboptimal measurement result, and so on. It may also be that the CSI-RS resource with the optimal measurement result is at the end, followed by the CSI-RS resource with the suboptimal measurement result, and so on, as shown in FIG. 15.

In some embodiments, the first information may further include first measurement information, and the first measurement information is configured to indicate measurement results corresponding to the N CSI-RS resources.

That is, the second terminal device feeds back the indexes of the N CSI-RS resources and measurement results corresponding thereto.

In some embodiments, when the first terminal device needs to switch among spatial domain transmission filters, the first terminal device may quickly select and switch to a spatial domain transmission filter from N spatial domain transmission filters corresponding to the N CSI-RS resources fed back by the second terminal device, and it is unnecessary for the first terminal device to perform the process of selecting an optimal spatial domain transmission filter again.

Specifically, for example, when the SL operates in a millimeter wave band, a link between the sending terminal and the receiving terminal easily causes failure of a current transmission link due to occlusion by other objects. In this case, the sending terminal needs to re-determine an optimal spatial domain transmission filter. In a case that the receiving terminal feeds back only one CSI-RS resource, when the link fails, the sending terminal needs to re-perform the process of selecting an optimal spatial domain transmission filter, to re-determine a new optimal spatial domain transmission filter. In a case that the receiving terminal feeds back N CSI-RS resources, when the spatial domain transmission filter selected by the sending terminal fails, the sending terminal may select one from spatial domain transmission filters corresponding to remaining N−1 CSI-RS resources fed back by the receiving terminal, to perform SL transmission. For example, the sending terminal may select a CSI-RS resource corresponding to a suboptimal measurement result, and then determine a spatial domain transmission filter corresponding to the CSI-RS resource. Therefore, it avoids re-selecting an optimal spatial domain transmission filter, and the speed of reselection of a spatial domain transmission filter or failure recovery (beam failure recovery) of the spatial domain transmission filter is improved.

Specifically, for example, when the sending terminal needs to transmit SL data to multiple receiving terminals simultaneously (for example, the sending terminal needs to send SL feedback information to multiple receiving terminals in a same slot), in a case that each receiving terminal feeds back a plurality of preferred CSI-RS resources (equivalent to a case of feeding back only one preferred CSI-RS resource), the sending terminal may select a spatial domain transmission filter with a higher probability to transmit SL data to multiple receiving terminals simultaneously. For example, the sending terminal may support four spatial domain transmission filters corresponding to spatial domain transmission filters 0 to 3 respectively. When receiving terminal 1 feeds back only one preferred spatial domain transmission filter such as spatial domain transmission filter 0, and receiving terminal 2 feeds back an preferred spatial domain transmission filter such as spatial domain transmission filter 2, the sending terminal cannot transmit SL data to two receiving terminals simultaneously. Furthermore, when the receiving terminal 1 feeds back two preferred spatial domain transmission filters such as spatial domain transmission filters 0 and 1, and the receiving terminal 2 feeds back two preferred spatial domain transmission filters such as spatial domain transmission filters 1 and 2, the sending terminal may use the spatial domain transmission filter 1 to transmit SL data to two receiving terminals simultaneously.

In some embodiments, measurement results corresponding to the N CSI-RS resources may be equal to or greater than a first threshold.

In some embodiments, the first threshold may be pre-configured or agreed on in a protocol; or, the first threshold may be configured by a network device; or, the first threshold may be configured by the first terminal device.

In some embodiments, the N CSI-RS resources may correspond to first N CSI-RSs among CSI-RSs received by the second terminal device and may be arranged in a descending order of measurement results of the received CSI-RSs.

In some embodiments, the N CSI-RS resources may include N1 first-type CSI-RS resources and N2 second-type CSI-RS resources, the N1 first-type CSI-RS resources corresponding to CSI-RSs received by the second terminal device, or the N1 first-type CSI-RS resources corresponding to CSI-RSs received by the second terminal device whose measurement results are equal to or greater than a first threshold; and indexes of the N2 second-type CSI-RS resources may be determined by at least one of the N1 first-type CSI-RS resources; or, the indexes of the N2 second-type CSI-RS resources may be determined by at least one of CSI-RS resources other than the N1 first-type CSI-RS resources among a plurality of CSI-RS resources, measurement results corresponding to the N2 second-type CSI-RS resources being default values, N1 and N2 being positive integers, and N1+N2=N.

For example, the number of CSI-RSs sent by the first terminal device and detected by the second terminal device may be less than N, or the number of CSI-RS resources where detected CSI-RSs meet reporting conditions may be less than N. In this case, the N CSI-RS resources include N1 first-type CSI-RS resources and N2 second-type CSI-RS resources.

When the first terminal device receives feedback information (i.e., the first information) from the second terminal device, the first terminal device may determine according to the default value that CSI-RS resource index corresponding thereto is an invalid index.

In some embodiments, the default value may be pre-configured or agreed on in a protocol; or, the default value may be configured by the network device; or, the default value may be configured by the first terminal device for the second terminal device; or, the default value may be configured by the second terminal device for the first terminal device; or, the default value may be configured by a third terminal device, and the third terminal device may be a Cluster Header (CH) terminal of a communication group where the first terminal device and the second terminal device are located.

In some embodiments, the CH terminal may be a terminal with at least one of the following functions in the communication group: resource management, resource allocation, resource coordination, resource configuration, or joining and exiting management of group members.

Specifically, for example, the default value may indicate a default measurement result when no measurement result is present. When the measurement result fed back by the receiving terminal to the sending terminal is the default value, it indicates that the receiving terminal has no measurement result of the CSI-RS resource corresponding to the default value.

For example, in a case that the default value is pre-configured or configured by the network device, for example, the default value is included in the resource pool configuration information or SL BWP configuration information.

For example, in a case that the default value is configured by the sending terminal for the receiving terminal or configured by the receiving terminal for the sending terminal, for example, in a process of establishing a unicast link, the sending terminal may send PC5-RRC signaling which carries information about the default value to the receiving terminal.

In some embodiments, the default value may be less than or equal to a second threshold; or, the default value may correspond to negative infinity or infinity.

In some embodiments, the second threshold may be pre-configured or agreed on in a protocol; or, the second threshold may be configured by the network device; or, the second threshold may be configured by the first terminal device.

In some embodiments, the default value may be less than or equal to a value corresponding to a lowest measurement result.

In some embodiments, in a case that the indexes of the N2 second-type CSI-RS resources are determined by at least one of the N1 first-type CSI-RS resources, for example, a resource index corresponding to a CSI-RS resource with an optimal or worst measurement result in the N1 first-type CSI-RS resources is selected specifically, to be used as indexes of the N2 second-type CSI-RS resources. For example, in FIG. 12 and FIG. 13, N=3, the CSI-RS resource set includes four CSI-RS resources, however, the second terminal device receives only two CSI-RSs (such as CSI-RS resource 1 and CSI-RS resource 2), and has corresponding measurement results which are RSRP1=−10 dBm, RSRP2=−20 dBm respectively. In addition to feeding back resource indexes corresponding to CSI-RS resource 1 and CSI-RS resource 2, the second terminal device needs to feed back a CSI-RS resource index. The second terminal device selects a CSI-RS with an optimal RSRP measurement result, i.e., CSI-RS resource 1, and feeds back its CSI-RS resource index. The second terminal device arranges corresponding CSI-RS resources in a descending order of RSRP measurement results, and an order of CSI-RS resource indexes fed back is shown in FIG. 16. Therefore, two CSI-RS resource index values which are 1 and a CSI-RS resource index value which is 2 are included in three CSI-RS resource indexes fed back by the second terminal device. When the first terminal device receives feedback information from the second terminal device, the first terminal device may determine that one of CSI-RS indexes 1 (such as the second CSI-RS resource index 1) is an invalid index according to repeated CSI-RS resource indexes 1.

In some embodiments, in a case that the indexes of the N2 second-type CSI-RS resources are determined by at least one of the N1 first-type CSI-RS resources, for another example, a resource index corresponding to a CSI-RS resource with an optimal or worst measurement result in the N1 first-type CSI-RS resources is selected specifically, to be used as indexes of the N2 second-type CSI-RS resources. For example, in FIG. 12 and FIG. 13, N=4, the CSI-RS resource set includes four CSI-RS resources, however, the second terminal device receives only two CSI-RSs (such as CSI-RS resource 1 and CSI-RS resource 2), and has corresponding measurement results which are RSRP1=−10 dBm, RSRP2=−20 dBm respectively. In addition to feeding back resource indexes corresponding to CSI-RS resource 1 and CSI-RS resource 2, the second terminal device needs to feed back two CSI-RS resource indexes. Since both CSI-RS resource 1 and CSI-RS resource 2 have measurement results, the second terminal device may feed back CSI-RS resource 1 and CSI-RS resource 2 repeatedly, thus an order of CSI-RS resource indexes fed back is shown in FIG. 17. Therefore, two CSI-RS resource index values 1 and two CSI-RS resource index values 2 are included in four CSI-RS resource indexes fed back by the second terminal device. When the first terminal device receives feedback information from the second terminal device, the first terminal device may determine that one of CSI-RS indexes (such as the second CSI-RS resource index 1 and the second CSI-RS resource index 2) is an invalid index according to repeated CSI-RS resource indexes.

In some embodiments, when the number of CSI-RS resources detected by the second terminal device and meeting conditions is N1 (N1<N), the second terminal device may feed back N CSI-RS resource information and N measurement results, which include N1 CSI-RS resource information meeting conditions, measurement results corresponding thereto, and other N-N1 CSI-RS resource information of which corresponding measurement results are default values.

Specifically, the CSI-RS resources meeting conditions include the following two cases.

First case: the CSI-RS resources meeting conditions include CSI-RS resources detected by the second terminal device. That is, the second terminal device may detect SCI sent by the first terminal device. When the SCI is detected, resource information of a CSI-RS sent by the first terminal device may be determined through the SCI. Therefore, the second terminal device may measure the CSI-RS and obtain a measurement result of the CSI-RS.

Second case: the CSI-RS resources meeting conditions include CSI-RS resources detected by the second terminal device, and measurement results of the CSI-RS resources exceed a first threshold. That is, the second terminal device may feed back CSI-RS resource information only when the second terminal device detects CSI-RS resources and measurement results thereof exceed the first threshold. For example, the second terminal device detects three CSI-RS resources (such as CSI-RS resource 1, CSI-RS resource 2 and CSI-RS resource 3) sent by the first terminal device, measurement results corresponding thereto are RSRP1=−10 dBm, RSRP2=−20 dBm, RSRP3=−120 dBm respectively, and a RSRP threshold (i.e., the first threshold) is −80 dBm. Since the measurement result corresponding to CSI-RS resource 3 is less than the RSRP threshold, the CSI-RS resource information fed back by the second terminal device includes CSI-RS resource 1 and CSI-RS resource 2 only, and CSI-RS resource 3 is not fed back.

Specifically, for example, the second terminal device may select any CSI-RS resource (in addition to the CSI-RS resources meeting conditions) to associate with the default value. For example, in FIG. 12 and FIG. 13, N=2, the CSI-RS resource set includes four CSI-RS resources, however, the second terminal device receives only one CSI-RS (such as CSI-RS resource 2), and the measurement result is RSRP2=−20 dBm (meeting conditions in the first case above). Then, in addition to feeding back index 2 of the CSI-RS resource and the measurement result of the CSI-RS resource, the second terminal device needs to feed back another CSI-RS resource index and a corresponding measurement result. Then, the second terminal device randomly selects one of CSI-RS resources 0/1/3 and feeds back a corresponding index value, and a corresponding measurement result is set as the default value. For example, the second terminal device selects CSI-RS resource 0, sets its measurement result as the default value, and feeds it back to the first terminal device, as shown in FIG. 20.

Specifically, for another example, in addition to feeding back N1 CSI-RS resource information meeting conditions and measurement results corresponding thereto, when the second terminal device feeds back other N-N1 CSI-RS resource information, the second terminal device may select a CSI-RS resource from N1 CSI-RS resources meeting conditions, and set its measurement result as the default value. For example, the second terminal device may select a CSI-RS resource with an optimal or worst measurement result from N1 CSI-RS resources, or arbitrarily or randomly select a CSI-RS. For example, in FIG. 12 and FIG. 13, N=3, the CSI-RS resource set includes four CSI-RS resources, however, the second terminal device receives only two CSI-RSs (such as CSI-RS resource 1 and CSI-RS resource 2), and has corresponding measurement results which are RSRP1=−10 dBm, RSRP2=−20 dBm respectively. A RSRP threshold is −80 dBm, thus measurement results of two CSI-RS resources are greater than the threshold (meeting conditions in the second case above). In addition to feeding back resource indexes corresponding to CSI-RS resource 1 and CSI-RS resource 2 and measurement results corresponding thereto, the second terminal device needs to feed back another CSI-RS resource index and a measurement result corresponding thereto. Then, the second terminal device selects a CSI-RS with an optimal RSRP measurement result, i.e., CSI-RS resource 1, and sets its measurement value as the default value. Therefore, two CSI-RS resource index values 1 and a CSI-RS resource index value 2 are included in three CSI-RS resource indexes fed back by the second terminal device, and measurement results corresponding to the two CSI-RS resource index values 1 respectively are −10 dBm and the default value, as shown in FIG. 19.

In some embodiments, the first measurement information may include quantization index information of the measurement results respectively corresponding to the N CSI-RS resources.

In some embodiments, the number of bits occupied by the indexes of the N CSI-RS resources and the quantization index information of the measurement results respectively corresponding to the N CSI-RS resources may be:

$$(A+B)\times N;$$

here, A represents the number of bits occupied by an index of a CSI-RS resource among the indexes of the N CSI-RS resources, and B represents the number of bits occupied by quantization index information of a measurement result corresponding to one of the N CSI-RS resources, and $$A=\lceil \log_2 M \rceil.$$

For example, M=8, then A=3. RSRP (or SINR) measurement results are quantized, and a quantized RSRP (or SINR) value is represented by B bits, for example, B=7; a range of the quantized RSRP is [B1, B2]dBm (such as [−140, −44] dBm) with a step size of 1 dBm.

In some embodiments, the first measurement information may include quantization index information of a first measurement result and N−1 differential quantization index information, the first measurement result corresponding to a highest value among the measurement results corresponding to the N CSI-RS resources.

In some embodiments, the number of bits occupied by the indexes of the N CSI-RS resources and the quantization index information of the measurement results respectively corresponding to the N CSI-RS resources may be:

$$A\times N+B+C\times(N-1);$$

here, A represents the number of bits occupied by an index of a CSI-RS resource among the indexes of the N CSI-RS resources; B represents the number of bits occupied by quantization index information of a first CSI-RS resource of the N CSI-RS resources, and a measurement result corresponding to the first CSI-RS resource is a CSI-RS resource with a largest corresponding measurement result among the N CSI-RS resources; C represents the number of bits occupied by quantization index information of a difference between the measurement result corresponding to the first CSI-RS resource and a measurement result corresponding to another CSI-RS resource among the N CSI-RS resources, or, C represents the number of bits occupied by quantization index information of a difference between measurement results corresponding to two adjacent CSI-RS resources among the N CSI-RS resources, and $A=\lceil \log_2 M \rceil$.

Specifically, for example, RSRP (or SINR) measurement results are quantized, a measurement result with the largest RSRP (or SINR) is represented by B bits, the remaining measurement results are represented by differential RSRP (or differential SINR), for example, B=7, and the differential RSRP is represented by C bits, for example, C=4; a range of the RSRP measurement results represented by B bits is [B1, B2] dBm (such as [−140, −44] dBm) with a step size of 1 dBm, and a range represented by the differential RSRP is [C1, C2] dB (such as [−30, 0] dB) with a step size of 2 dB. The differential RSRP is obtained relative to a maximum RSRP measurement result, that is, the differential RSRP represents a difference with the maximum RSRP measurement result. Alternatively, the differential RSRP is obtained relative to a RSRP measurement result which is adjacent to and greater than the differential RSRP.

For example, in a case that three measured RSRP results are −60 dBm, −70 dBm, −90 dBm respectively, when a first differential RSRP mode is used, a maximum RSRP corresponds to −60 dBm, and the remaining two differential RSRPs are −10 dB and −30 dB respectively; when a second differential RSRP mode is used, a maximum RSRP corresponds to −60 dBm, and the remaining two differential RSRPs are −10 dB and −20 dB respectively.

In some embodiments, the second terminal device may perform RSRP measurement based on CSI-RSs, and feed back RSRP measurement results. In general, in order to feed back measurement results quickly, the second terminal device usually uses SCI or MAC CE to carry the fed back CSI-RS resource information and corresponding measurement results. Therefore, it is necessary to quantize the RSRP measurement results. Furthermore, what fed back by the second terminal device is Layer 1 RSRP measurement result (i.e., L1 RSRP), that is, a RSRP result measured at a physical layer is directly quantized and then fed back to the first terminal device without subjecting to Layer 3 filtering.

For example, the measured RSRP is quantized with 7 bits, as shown in Table 1 below.

TABLE 1

| Report value | L1 RSRP | Unit |
|---|---|---|
| RSRP_0 | invalid | dBm |
| RSRP_1 | invalid | dBm |
| RSRP_2 | invalid | dBm |
| RSRP_3 | invalid | dBm |
| RSRP_4 | invalid | dBm |
| RSRP_5 | invalid | dBm |
| RSRP_6 | invalid | dBm |
| RSRP_7 | invalid | dBm |
| RSRP_8 | invalid | dBm |
| RSRP_9 | invalid | dBm |
| RSRP_10 | invalid | dBm |
| RSRP_11 | invalid | dBm |

TABLE 1-continued

| Report value | L1 RSRP | Unit |
|---|---|---|
| RSRP_12 | invalid | dBm |
| RSRP_13 | invalid | dBm |
| RSRP_14 | invalid | dBm |
| RSRP_15 | invalid | dBm |
| RSRP_16 | RSRP < −140 | dBm |
| RSRP_17 | −140 ≤ RSRP < −139 | dBm |
| RSRP_18 | −139 ≤ RSRP < −138 | dBm |
| . . . | | . . . |
| RSRP_111 | −46 ≤ RSRP < −45 | dBm |
| RSRP_112 | −45 ≤ RSRP < −44 | dBm |
| RSRP_113 | −44 ≤ RSRP | dBm |
| RSRP_114 | invalid | dBm |
| RSRP_115 | invalid | dBm |
| RSRP_116 | invalid | dBm |
| RSRP_117 | invalid | dBm |
| RSRP_118 | invalid | dBm |
| RSRP_119 | invalid | dBm |
| RSRP_120 | invalid | dBm |
| RSRP_121 | invalid | dBm |
| RSRP_122 | invalid | dBm |
| RSRP_123 | invalid | dBm |
| RSRP_124 | invalid | dBm |
| RSRP_125 | invalid | dBm |
| RSRP_126 | invalid | dBm |
| RSRP_127 | infinity | dBm |

As may be seen from the above Table 1, a range of quantized RSRP is [−140, 44] dBm, a measurement result less than a minimum value (i.e., −140 dBm) is represented by a RSRP index, and a measurement result equal to or greater than a maximum value (i.e., 44 dBm) is represented by a RSRP index. Therefore, the default value may be defined to be less than or equal to the minimum value in the quantization range. For example, the default RSRP is −141 dBm which is less than the minimum quantized value; in this case, the quantized RSRP may be represented as the following table. When an index corresponding to RSRP fed back by the second terminal device to the first terminal device is RSRP_15, it indicates that the second terminal device feeds back the default RSRP value, that is, the second terminal device does not detect the CSI-RS resource corresponding to the RSRP measurement value.

For another example, the measured RSRP is quantized with 7 bits, as shown in Table 2 below.

TABLE 2

| Report value | L1 RSRP | Unit |
|---|---|---|
| RSRP_0 | invalid | dBm |
| RSRP_1 | invalid | dBm |
| RSRP_2 | invalid | dBm |
| RSRP_3 | invalid | dBm |
| RSRP_4 | invalid | dBm |
| RSRP_5 | invalid | dBm |
| RSRP_6 | invalid | dBm |
| RSRP_7 | invalid | dBm |
| RSRP_8 | invalid | dBm |
| RSRP_9 | invalid | dBm |
| RSRP_10 | invalid | dBm |
| RSRP_11 | invalid | dBm |
| RSRP_12 | invalid | dBm |
| RSRP_13 | invalid | dBm |
| RSRP_14 | invalid | dBm |
| RSRP_15 | RSRP < −141 | dBm |
| RSRP_16 | −141 ≤ RSRP < −140 | dBm |
| RSRP_17 | −140 ≤ RSRP < −139 | dBm |
| RSRP_18 | −139 ≤ RSRP < −138 | dBm |
| . . . | | . . . |
| RSRP_111 | −46 ≤ RSRP < −45 | dBm |
| RSRP_112 | −45 ≤ RSRP < −44 | dBm |
| RSRP_113 | −44 ≤ RSRP | dBm |

TABLE 2-continued

| Report value | L1 RSRP | Unit |
|---|---|---|
| RSRP_114 | invalid | dBm |
| RSRP_115 | invalid | dBm |
| RSRP_116 | invalid | dBm |
| RSRP_117 | invalid | dBm |
| RSRP_118 | invalid | dBm |
| RSRP_119 | invalid | dBm |
| RSRP_120 | invalid | dBm |
| RSRP_121 | invalid | dBm |
| RSRP_122 | invalid | dBm |
| RSRP_123 | invalid | dBm |
| RSRP_124 | invalid | dBm |
| RSRP_125 | invalid | dBm |
| RSRP_126 | invalid | dBm |
| RSRP_127 | infinity | dBm |

For another example, the default RSRP is set as negative infinity (or a very small value, such as −1000 dBm); or, the default RSRP is set as infinity (or a very large value, such as 1000 dBm); in such a case, the quantized RSRP may be represented by the following Table 3-1 and Table 3-2 respectively. When an index corresponding to RSRP fed back by the second terminal device to the first terminal device is RSRP_0 in Table 3-1 (or RSRP_127 in Table 3-2), it indicates that the second terminal device feeds back the default RSRP value, that is, the second terminal device does not detect the CSI-RS resource corresponding to the RSRP measurement value.

TABLE 3-1

| Report value | L1 RSRP | Unit |
|---|---|---|
| RSRP_0 | negative infinity | dBm |
| RSRP_1 | invalid | dBm |
| RSRP_2 | invalid | dBm |
| RSRP_3 | invalid | dBm |
| RSRP_4 | invalid | dBm |
| RSRP_5 | invalid | dBm |
| RSRP_6 | invalid | dBm |
| RSRP_7 | invalid | dBm |
| RSRP_8 | invalid | dBm |
| RSRP_9 | invalid | dBm |
| RSRP_10 | invalid | dBm |
| RSRP_11 | invalid | dBm |
| RSRP_12 | invalid | dBm |
| RSRP_13 | invalid | dBm |
| RSRP_14 | invalid | dBm |
| RSRP_15 | invalid | dBm |
| RSRP_16 | RSRP < −140 | dBm |
| RSRP_17 | −140 ≤ RSRP < −139 | dBm |
| RSRP_18 | −139 ≤ RSRP < −138 | dBm |
| . . . | | . . . |
| RSRP_111 | −46 ≤ RSRP < −45 | dBm |
| RSRP_112 | −45 ≤ RSRP < −44 | dBm |
| RSRP_113 | −44 ≤ RSRP | dBm |
| RSRP_114 | invalid | dBm |
| RSRP_115 | invalid | dBm |
| RSRP_116 | invalid | dBm |
| RSRP_117 | invalid | dBm |
| RSRP_118 | invalid | dBm |
| RSRP_119 | invalid | dBm |
| RSRP_120 | invalid | dBm |
| RSRP_121 | invalid | dBm |
| RSRP_122 | invalid | dBm |
| RSRP_123 | invalid | dBm |
| RSRP_124 | invalid | dBm |
| RSRP_125 | invalid | dBm |
| RSRP_126 | invalid | dBm |
| RSRP_127 | invalid | dBm |

TABLE 3-2

| Report value | L1 RSRP | Unit |
|---|---|---|
| RSRP_0 | invalid | dBm |
| RSRP_1 | invalid | dBm |
| RSRP_2 | invalid | dBm |
| RSRP_3 | invalid | dBm |
| RSRP_4 | invalid | dBm |
| RSRP_5 | invalid | dBm |
| RSRP_6 | invalid | dBm |
| RSRP_7 | invalid | dBm |
| RSRP_8 | invalid | dBm |
| RSRP_9 | invalid | dBm |
| RSRP_10 | invalid | dBm |
| RSRP_11 | invalid | dBm |
| RSRP_12 | invalid | dBm |
| RSRP_13 | invalid | dBm |
| RSRP_14 | invalid | dBm |
| RSRP_15 | invalid | dBm |
| RSRP_16 | RSRP < −140 | dBm |
| RSRP_17 | −140 ≤ RSRP < −139 | dBm |
| RSRP_18 | −139 ≤ RSRP < −138 | dBm |
| . . . | | . . . |
| RSRP_111 | −46 ≤ RSRP < −45 | dBm |
| RSRP_112 | −45 ≤ RSRP < −44 | dBm |
| RSRP_113 | −44 ≤ RSRP | dBm |
| RSRP_114 | invalid | dBm |
| RSRP_115 | invalid | dBm |
| RSRP_116 | invalid | dBm |
| RSRP_117 | invalid | dBm |
| RSRP_118 | invalid | dBm |
| RSRP_119 | invalid | dBm |
| RSRP_120 | invalid | dBm |
| RSRP_121 | invalid | dBm |
| RSRP_122 | invalid | dBm |
| RSRP_123 | invalid | dBm |
| RSRP_124 | invalid | dBm |
| RSRP_125 | invalid | dBm |
| RSRP_126 | invalid | dBm |
| RSRP_127 | infinity | dBm |

When the above examples are applicable to the N CSI-RSs fed back by the second terminal device and measurement results thereof, a corresponding RSRP result (such as a 7-bit quantization result) is fed back for each measurement result. However, in general cases, in order to reduce overhead of feedback signaling, the second terminal device usually uses a differential RSRP feedback mode for multiple RSRP measurement results.

For example, when the second terminal device needs to feed back N CSI-RS resource information and corresponding RSRP measurement results, for CSI-RS resource information with an optimal RSRP measurement result, the second terminal device feeds back a CSI-RS corresponding thereto and a corresponding RSRP measurement result (such as a RSRP index after 7-bit quantization in the above Table 1); however, a feedback differential RSRP mode is usually used for other N−1 measurement results. The so-called differential RSRP may include two cases.

First case: a difference between a RSRP result and an optimal RSRP result.

For example, the second terminal device detects three CSI-RS resources corresponding to CSI-RS resource 1, CSI-RS resource 2, CSI-RS resource 3 respectively, and performs measurement on them respectively to obtain three RSRP results which are RSRP1=−10 dBm, RSRP2=−20 dBm, RSRP3=−35 dBm respectively. When differential RSRP feedback is used, three RSRP results fed back by the second terminal device are respectively:

Index 1 for feeding back CSI-RS resource 1 and its corresponding RSRP measurement result, that is, RSRP1=−10 dBm;

Index 2 for feeding back CSI-RS resource 2 and its differential RSRP measurement result relative to RSRP1, that is, ΔRSRP=−10 dB, a corresponding differential RSRP index is "DIFFRSRP_5" according to the following Table 4; and Index 3 for feeding back CSI-RS resource 3 and its differential RSRP measurement result relative to RSRP1, that is, ΔRSRP=−25 dB, a corresponding differential RSRP index is "DIFFRSRP_12" according to the following Table 4.

Second case: a difference between a RSRP measurement result and an adjacent measurement result equal to or greater than the RSRP measurement result.

For example, the second terminal device detects three CSI-RS resources corresponding to CSI-RS resource 1, CSI-RS resource 2, CSI-RS resource 3 respectively, and performs measurement on them respectively to obtain three RSRP results which are RSRP1=−10 dBm, RSRP2=−20 dBm, RSRP3=−35 dBm respectively. When differential RSRP feedback is used, three RSRP results fed back by the second terminal device are respectively:

Index 1 for feeding back CSI-RS resource 1 and its corresponding RSRP measurement result, that is, RSRP1=−10 dBm;

Index 2 for feeding back CSI-RS resource 2 and its differential RSRP measurement result relative to RSRP1, that is, ΔRSRP=−10 dB, a corresponding differential RSRP index is "DIFFRSRP_5" according to the following Table 4; and Index 3 for feeding back CSI-RS resource 3 and its differential RSRP measurement result relative to RSRP2, that is, ΔRSRP=−15 dB, a corresponding differential RSRP index is "DIFFRSRP_7" according to the following Table 4.

TABLE 4

| Report value | Measured quantization value (difference between measured RSRP and strongest RSRP) | Unit |
|---|---|---|
| DIFFRSRP_0 | 0 ≥ ΔRSRP > −2 | dB |
| DIFFRSRP_1 | −2 ≥ ΔRSRP > −4 | dB |
| DIFFRSRP_2 | −4 ≥ ΔRSRP > −6 | dB |
| DIFFRSRP_3 | −6 ≥ ΔRSRP > −8 | dB |
| DIFFRSRP_4 | −8 ≥ ΔRSRP > −10 | dB |
| DIFFRSRP_5 | −10 ≥ ΔRSRP > −12 | dB |
| DIFFRSRP_6 | −12 ≥ ΔRSRP > −14 | dB |
| DIFFRSRP_7 | −14 ≥ ΔRSRP > −16 | dB |
| DIFFRSRP_8 | −16 ≥ ΔRSRP > −18 | dB |
| DIFFRSRP_9 | −18 ≥ ΔRSRP > −20 | dB |
| DIFFRSRP_10 | −20 ≥ ΔRSRP > −22 | dB |
| DIFFRSRP_11 | −22 ≥ ΔRSRP > −24 | dB |
| DIFFRSRP_12 | −24 ≥ ΔRSRP > −26 | dB |
| DIFFRSRP_13 | −26 ≥ ΔRSRP > −28 | dB |
| DIFFRSRP_14 | −28 ≥ ΔRSRP > −30 | dB |
| DIFFRSRP_15 | −30 ≥ ΔRSRP | dB |

In some embodiments, when differential RSRP is used for feedback, a default value of the differential RSRP may be defined. For example, in Table 4, a last differential RSRP index (i.e., DIFFRSRP_15) is set as the default value, that is, when differential RSRP fed back by the second terminal device corresponds to the index, it indicates that the second terminal device does not detect CSI-RS resources associated with the differential RSRP measurement result.

In some embodiments, the first information may include indexes of N3 CSI-RS resources, and the N3 CSI-RS resources may be determined by the second terminal device according to measurement results obtained by measuring received CSI-RSs, N3<N, N representing quantity of CSI-RS resources required to be fed back or reported by the second terminal device, N3 and N being positive integers, and N≤MV.

In some embodiments, the N3 CSI-RS resources may correspond to CSI-RSs received by the second terminal device; or, the N3 CSI-RS resources may correspond to CSI-RSs received by the second terminal device, measurement results corresponding thereto being equal to or greater than a first threshold.

In some embodiments, the indexes of the N3 CSI-RS resources may be arranged in a descending order of measurement results corresponding to the N3 CSI-RS resources; or, the indexes of the N3 CSI-RS resources may arranged in an ascending order of the measurement results corresponding to the N3 CSI-RS resources. Details may refer to the above relevant descriptions on the quantization index information of the measurement results respectively corresponding to the N CSI-RS resources, which are not be elaborated here.

In some embodiments, the first information may further include second measurement information, and the second measurement information is configured to indicate measurement results corresponding to the N3 CSI-RS resources.

In some embodiments, the second measurement information may include quantization index information of the measurement results respectively corresponding to the N3 CSI-RS resources. Details may refer to the above relevant descriptions on the quantization index information of the measurement results respectively corresponding to the N CSI-RS resources, which are not be elaborated here.

In some embodiments, the second measurement information may include quantization index information of a second measurement result and N3-1 differential quantization index information, and the second measurement result may correspond to a highest value among the measurement results corresponding to the N3 CSI-RS resources. Details may refer to the above relevant descriptions on the quantization index information of the measurement results respectively corresponding to the N CSI-RS resources, which are not be elaborated here.

In some embodiments, the first information may further include fifth indication information, the fifth indication information being configured to indicate a value of N3.

In some embodiments, the measurement results may include SL RSRP and/or SL SINR.

In some embodiments, the first information may be carried by one of SCI, MAC CE, PSFCH, and PC5-RRC signaling.

Specifically, for example, an information field included in the SCI, MAC CE or PC5-RRC is configured to indicate a value of the parameter N and/or N3.

In some embodiments, when the first information is carried by the MAC CE, a format of the MAC CE may be as shown in FIGS. 20A-20D or FIG. 21A-21D.

Figure 20A:
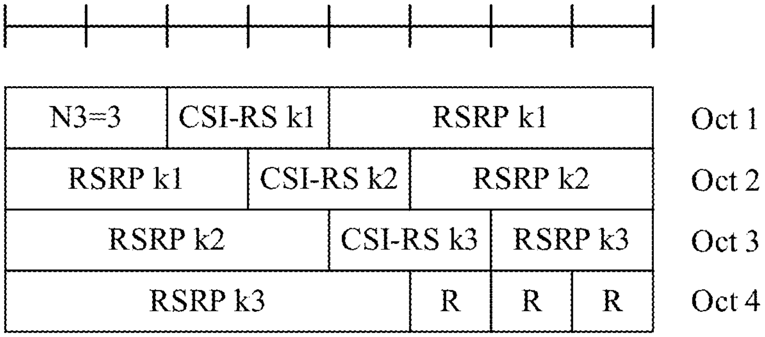
FIG. 20A, FIG. 20B, FIG. 20C and FIG. 20D are schematic diagrams of a MAC CE carrying first information according to embodiments of the disclosure.
Figure 20B:
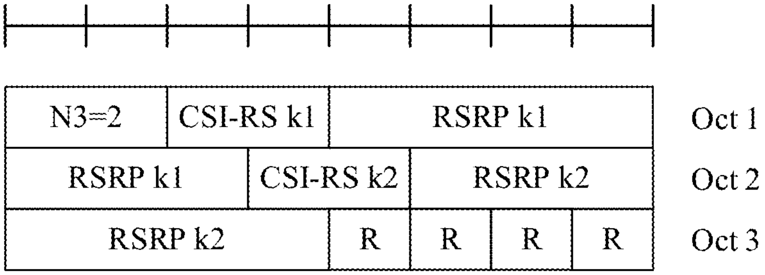
Figure 20C:
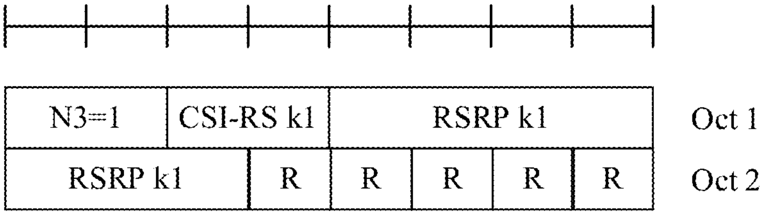

Specifically, for example, when quantized RSRP indexes corresponding to RSRP to be fed back are fed back (as shown in Table 1), that is, when each RSRP is represented by 7 bits, the MAC CE includes N3 CSI-RS resource indexes and RSRP measurement results corresponding thereto, and includes an information field to indicate the value of N3. As shown in FIGS. 20A-20D, N=3, that is, at most three CSI-RS resources and measurement results corresponding thereto are fed back, and the CSI-RS resource set includes four CSI-RS resources, thus CSI-RS indexes are represented by two bits, the value of N3 is less than or equal to N, that is, N3<=3, and thus N3 also needs to be represented by 2 bits; k1/k2/k3 in the figure represents respective index information corresponding to three CSI-RS resources. In this mode, since each RSRP measurement result is represented by 7 bits, an order of CSI-RS resources in the MAC CE may not be stipulated. Preferably, the larger the RSRP measurement result, the higher the position in the MAC CE. Oct1 represents byte 1, and so on. FIG. 20A, FIG. 20B and FIG. 20C may be considered as cases of N3=3, N3=2, N3=1 respectively.

Figure 20D:
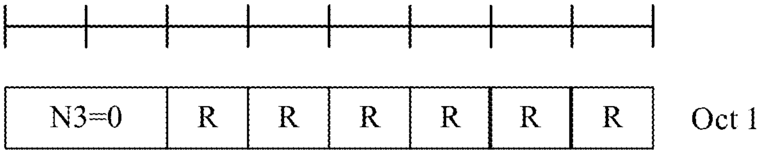

In particular, when N3=0, that is, when the second terminal device does not receive any CSI-RS from the first terminal device, or when none of detected CSI-RS resources meet conditions, the second terminal device may send indication information (i.e., second information) to the first terminal device at this time, to indicate that the second terminal device does not receive CSI-RSs, or indicate that the first terminal device resends CSI-RSs in turn. Optionally, the second terminal device may send the indication information (i.e., the second information) through the SCI, MAC CE or PC5-RRC. When the indication information (i.e., the second information) is carried through the MAC CE, it is shown in FIG. 20D.

For another example, when differential RSRP is used for feedback, a highest RSRP measurement result is represented by 7 bits (as shown in Table 1), and other RSRP measurement results are represented by 4-bit differential RSRP (as shown in Table 4). The MAC CE includes N1 CSI-RS resource indexes and RSRP measurement results corresponding thereto. As shown in FIGS. 21A-21D, N=3, that is, at most three CSI-RS resources and measurement results corresponding thereto are fed back, and the CSI-RS resource set includes four CSI-RS resources, thus CSI-RS indexes are represented by two bits, the value of N3 is less than or equal to N, that is, N3<=3, and thus N3 also needs to be represented by 2 bits; k1/k2/k3 in the figure represents respective index information corresponding to three CSI-RS resources. CSI-RS k1 represents a CSI-RS resource corresponding to the highest RSRP measurement result, CSI-RS k2 represents a CSI-RS resource corresponding to a second highest RSRP measurement result, and CSI-RS k3 represents a CSI-RS resource corresponding to a third highest RSRP measurement result. In this mode, an order of CSI-RS resources in the MAC CE is arranged in a descending order (or ascending order) of the RSRP measurement results. Oct1 represents byte 1, and so on. FIG. 21A, FIG. 21B and FIG. 21C may be considered as cases of N3=3, N3=2, N3=1 respectively.

In particular, when N3=0, that is, when the second terminal device does not receive any CSI-RS from the first terminal device, or when none of detected CSI-RS resources meet conditions, the second terminal device may send indication information (i.e., second information) to the first terminal device at this time, to indicate that the second terminal device does not receive CSI-RSs, or indicate that the first terminal device resends CSI-RSs in turn. Optionally, the second terminal device may send the indication information (i.e., the second information) through the SCI, MAC CE or PC5-RRC. When the indication information (i.e., the second information) is carried through the MAC CE, it is shown in FIG. 21D.

In some embodiments, as shown in FIG. 11, the method 200 may further include the following operations.

At S240, the first terminal device selects a target CSI-RS resource based on the first information, and a spatial domain transmission filter corresponding to the target CSI-RS resource is the target spatial domain transmission filter.

Furthermore, at S250, the first terminal device sends second SL data to the second terminal device by using the target spatial domain transmission filter. Correspondingly, the second terminal device receives the SL data sent by the first terminal device using the target spatial domain transmission filter corresponding to the target CSI-RS resource.

In some embodiments, a transmitting beam corresponding to the target CSI-RS resource may be considered as the target transmitting beam.

In some embodiments, the method may further include that:

the first terminal device sends second SL configuration information to the second terminal device, the second SL configuration information is configured to configure at least one TCI state, the at least one TCI state including a first TCI state, a reference signal included in the first TCI state being a CSI-RS corresponding to the target CSI-RS resource.

It may be known from the foregoing descriptions that the first terminal device may send CSI-RS resources by using different transmitting beams, and the second terminal device may receive CSI-RS resources by using a same receiving beam, and perform measurement and reporting based on the CSI-RS resources, so that the first terminal device may determine the target transmitting beam according to the report quantity. In this case, the determined target transmitting beam is the target transmitting beam corresponding to the receiving beam, that is, in a case that the first terminal device sends signals by using the target transmitting beam, SL transmission performance is optimal when the second terminal device receives signals by using the receiving beam.

Furthermore, in the embodiments of the disclosure, when the first terminal device sends CSI-RS resources by using different transmitting beams, the second terminal device may use polling to receive CSI-RS resources by using different receiving beams, to determine a target receiving beam corresponding to each receiving beam and obtain at least one TCI state.

For example, the first terminal device may send CSI-RS resources by using four transmitting beams (transmitting beam 0 to spatial domain transmitting beam 3) respectively, and the second terminal device may receive CSI-RS resources by using four receiving beams (receiving beam 0 to spatial domain receiving beam 3). For example, when the first terminal device sends CSI-RS resources by using four transmitting beams (transmitting beam 0 to spatial domain transmitting beam 3) respectively, the second terminal device receives CSI-RS resources by using receiving beam 0 at first, and performs measurement and reporting based on the CSI-RS resources, so that the first terminal device may determine a target transmitting beam according to the report quantity, and in this case, a target receiving beam is the target transmitting beam corresponding to receiving beam 0. Then, when the first terminal device sends CSI-RS resources by using four transmitting beams (transmitting beam 0 to spatial domain transmitting beam 3) respectively, the second terminal device receives CSI-RS resources by using receiving beam 1, and performs measurement and reporting based on the CSI-RS resources, so that the first terminal device may determine a target transmitting beam according to the report quantity, and in this case, a target receiving beam is the target transmitting beam corresponding to receiving beam 1. The above processes are performed by polling, to determine a target transmitting beam corresponding to each receiving beam.

In some embodiments, a QCL type included in the first TCI state may be QCL-TypeD.

In some embodiments, the method 200 may further include that:

the first terminal device sends sixth indication information to the second terminal device, the sixth indication information being configured to indicate the first TCI state. For example, the sixth indication information may include index information corresponding to the first TCI state.

In some embodiments, the sixth indication information may be carried by SCI, or MAC CE, or PC5-RRC signaling.

In some implementations, when the sixth indication information is carried by SCI or MAC CE, the first terminal device indicates activation of SL feedback In some SL communications, the first terminal device may indicate a corresponding TCI state for a SL signal or SL channel, and the second terminal device may receive the SL signal or SL channel by using a same receiving beam as a CSI-RS resource receiving the TCI state indication, which is beneficial to improve SL transmission performance.

In some embodiments, the method 200 may further include that:

the first terminal device receives second information from the second terminal device.

The second information is configured to indicate that the second terminal device fails to detect a CSI-RS; or, the second information is configured to indicate that measurement results corresponding to CSI-RSs detected by the second terminal device are all less than a first threshold; or, the second information is configured to indicate that the first terminal device resends the M CSI-RSs. Furthermore, the first terminal device may send the M CSI-RSs to the second terminal device respectively by reusing the spatial domain transmission filter.

In some embodiments, the operation of sending, by the second terminal device, the second information to the first terminal device may include that:

the second terminal device sends the second information to the first terminal device in a third time unit, the third time unit is located after a fourth time unit determined based on a latency boundary. In some embodiments, the second information may be carried by SCI, or MAC CE, or PSFCH, or PC5-RRC signaling.

Therefore, in the embodiments of the disclosure, an optimal spatial domain transmission filter between the first terminal device and the second terminal device may be selected.

In summary, the first terminal device and the second terminal device exchange at least one of sending configuration, receiving configuration, or reporting or feedback configuration of CSI-RS resources, so that the second terminal device may perform measurement and reporting of the CSI-RS resources based on the above configuration, the first terminal device may determine a target CSI-RS resource according to the report quantity, and a transmitting beam corresponding to the target CSI-RS resource may be considered as a target transmitting beam, thereby achieving selection of an optimal transmitting beam in an SL transmission system. Furthermore, the sending terminal may perform SL sending based on the optimal transmitting beam, and correspondingly, the receiving terminal may perform SL reception based on a receiving beam corresponding to the optimal transmitting beam, which is beneficial to improve SL transmission performance.

The method embodiments of the disclosure are described in detail as above with reference to FIG. 11 to FIG. 21, and apparatus embodiments of the disclosure are described in detail below with reference to FIG. 22 and FIG. 23. It should be understood that the apparatus embodiments and the method embodiments correspond to each other, similar descriptions may refer to the method embodiments.

Figure 22:
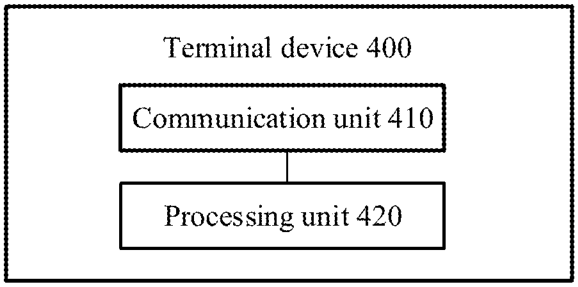
FIG. 22 is a schematic block diagram of a terminal device according to an embodiment of the disclosure.

FIG. 22 shows a schematic block diagram of a terminal device 400 according to an embodiment of the disclosure. As shown in FIG. 22, the terminal device 400 includes a communication unit 410.

The communication unit 410 is configured to send M CSI-RSs to a second terminal device by using spatial domain transmission filters, the M CSI-RSs being configured to select a target spatial domain transmission filter.

The M CSI-RSs correspond to a plurality of CSI-RS resources in a target CSI-RS resource set, and M is a positive integer.

In some embodiments, a corresponding repetition field in configuration information of the target CSI-RS resource set may take a first value.

The first value is configured to indicate that the terminal device does not use a same spatial domain transmission filter to send the CSI-RS resources in the target CSI-RS resource set.

In some embodiments, the communication unit 410 is further configured to send first indication information to a network device, and the first indication information is configured to indicate that the terminal device requests the network device to allocate transmission resources for sending CSI-RSs.

In some embodiments, the first indication information may include period information for the terminal device to send CSI-RSs.

In some embodiments, the first indication information may include a value of M.

In some embodiments, the communication unit 410 is further configured to receive first configuration information from the network device, the first configuration information including the transmission resources allocated by the network device to the terminal device for sending CSI-RSs.

In some embodiments, the first configuration information may include second indication information, the second indication information being configured to indicate that the transmission resources allocated by the network device are configured to send CSI-RSs configured to select the target spatial domain transmission filter.

In some embodiments, the first indication information may be carried by a PUCCH or uplink RRC signaling.

In some embodiments, the second indication information may be carried by DCI or RRC signaling.

In some embodiments, the communication unit 410 is further configured to send first SL configuration information to the second terminal device.

The first SL configuration information may include at least one of followings: an index of the target CSI-RS resource set; indexes of CSI-RS resources included in the target CSI-RS resource set; the number of the CSI-RS resources included in the target CSI-RS resource set; a value of M, correspondences between a CSI-RS resource set and CSI report quantity; quantity of CSI-RS resources reported or fed back by the second terminal device to the terminal device; a latency boundary; a value of a repetition field corresponding to the target CSI-RS resource set; transmission resource information used by the terminal device to send the M CSI-RSs; resource pool information corresponding to transmission resources used for the M CSI-RSs; or a transmission mode of the terminal device.

The repetition field corresponding to the target CSI-RS resource set may take a first value to indicate that the terminal device does not use a same spatial domain transmission filter to send CSI-RSs, and the repetition field corresponding to the target CSI-RS resource set may take a second value to indicate that the terminal device uses the same spatial domain transmission filter to send CSI-RSs.

In some embodiments, within the latency boundary, the terminal device does not expect the second terminal device to perform reporting or feedback for CSI-RSs; and/or, after exceeding the latency boundary, the second terminal device is allowed to perform the reporting or feedback for CSI-RSs; and/or, after exceeding the latency boundary, the second terminal device does not expect the terminal device to send CSI-RSs; and/or, after exceeding the latency boundary, the second terminal device stops receiving CSI-RSs sent by the terminal device.

In some embodiments, the communication unit 410 is further configured to send third indication information to the second terminal device.

The third indication information is configured to indicate at least one of followings: the terminal device being about to send CSI-RSs configured to select the target spatial domain transmission filter; the terminal device being about to use different spatial domain transmission filters to send CSI-RSs; CSI report quantity; an index of a first CSI-RS resource sent by the terminal device; or a time gap for the terminal device to send the first CSI-RS resource.

The time gap may take a time unit where the third indication information is located as reference.

In some embodiments, the communication unit 410 is further configured to send fourth indication information to the second terminal device.

The fourth indication information is configured to indicate that CSI-RSs sent by the terminal device are configured to select a spatial domain transmission filter used by the terminal device to transmit SL data; or, the fourth indication information is configured to indicate that the CSI-RSs sent by the terminal device are configured to select a spatial domain receiving filter used for the second terminal device to receive SL data; or, the fourth indication information is configured to indicate that the CSI-RSs sent by the terminal device are configured to measure CSI.

In some embodiments, the terminal device may further include a processing unit.

The processing unit is configured to: determine the target CSI-RS resource set based on a first CSI-RS resource set included in SL BWP configuration information or resource pool configuration information; and determine CSI-RS resources included in the target CSI-RS resource set based on CSI-RS resources included in the first CSI-RS resource set.

In some embodiments, the CSI report quantity may include at least one of followings: CRI; CRI and RSRP; CRI and SINR; slot indicator; slot indicator and RSRP; slot indicator and SINR; or no report.

In some embodiments, the first SL configuration information may be carried by SCI, or MAC CE, or PC5-RRC signaling.

In some embodiments, the third indication information may be carried by PC5-RRC signaling, or SCI, MAC CE, or sidelink feedback information.

In some embodiments, the fourth indication information may be carried by PC5-RRC signaling, or SCI, or MAC CE, or sidelink feedback information.

In some embodiments, the communication unit 410 is further configured to carry CSI-RS resource indication information corresponding to CSI-RSs in SCI associated with the CSI-RSs when the CSI-RSs are sent to the second terminal device by using the spatial domain transmission filters.

In some embodiments, the CSI-RS resource indication information corresponding to the CSI-RSs may include an index of a CSI-RS resource set corresponding to the CSI-RSs and/or an index of a CSI-RS resource.

In some embodiments, the communication unit 410 is further configured to receive first information from the second terminal device.

The first information may include target CSI report quantity, and the target CSI report quantity may include at least one of followings: CRI; CRI and RSRP; CRI and SINR, slot indicator; slot indicator and RSRP; or slot indicator and SINR.

Slot indicator information is configured to determine slots corresponding to CSI-RSs sent by the terminal device; or, the slot indicator information is configured to determine indexes corresponding to CSI-RS resources sent by the terminal device.

In some embodiments, the first information may include indexes of N CSI-RS resources; or, the first information is configured to determine the indexes of the N CSI-RS resources, the N CSI-RS resources being determined by the second terminal device according to measurement results of received CSI-RSs, N representing quantity of CSI-RS resources required to be reported or fed back by the second terminal device, N being a positive integer, and N≤M.

In some embodiments, the indexes of the N CSI-RS resources may be arranged in a descending order of measurement results corresponding to N CSI-RSs; or, the indexes of the N CSI-RS resources may be arranged in an ascending order of the measurement results corresponding to the N CSI-RSs.

In some embodiments, the first information may further include first measurement information, and the first measurement information is configured to indicate measurement results corresponding to the N CSI-RS resources.

In some embodiments, measurement results corresponding to the N CSI-RS resources may be equal to or greater than a first threshold.

In some embodiments, the N CSI-RS resources may include N1 first-type CSI-RS resources and N2 second-type CSI-RS resources, measurement results corresponding to the N1 first-type CSI-RS resources may be equal to or greater than a first threshold, and indexes of the N2 second-type CSI-RS resources may be determined by at least one of the N1 first-type CSI-RS resources; or, the indexes of the N2 second-type CSI-RS resources may be determined by at least one of CSI-RS resources other than the N1 first-type CSI-RS resources among a plurality of CSI-RS resources, and measurement results corresponding to the N2 second-type CSI-RS resources may be default values, N1 and N2 being positive integers, and N1+N2=N.

In some embodiments, the first measurement information may include quantization index information of the measurement results respectively corresponding to the N CSI-RS resources.

In some embodiments, the first measurement information may include quantization index information of a first measurement result and N−1 pieces of differential quantization index information, and the first measurement result may correspond to a highest value among the measurement results corresponding to the N CSI-RS resources.

In some embodiments, the first information may include indexes of N3 CSI-RS resources, and the N3 CSI-RS resources may be determined by the second terminal device according to measurement results obtained by measuring received CSI-RSs, N3<N, N representing quantity of CSI-RS resources required to be fed back or reported by the second terminal device, N3 and N being positive integers, and N≤M.

In some embodiments, measurement results corresponding to the N3 CSI-RS resources may be equal to or greater than a first threshold.

In some embodiments, the first information may further include fifth indication information, and the fifth indication information is configured to indicate a value of N3.

In some embodiments, the first information may further include second measurement information, and the second measurement information is configured to indicate measurement results corresponding to the N3 CSI-RS resources.

In some embodiments, the second measurement information may include quantization index information of the measurement results respectively corresponding to the N3 CSI-RS resources.

In some embodiments, the second measurement information may include quantization index information of a second measurement result and N3-1 pieces differential quantization index information, and the second measurement result may correspond to a highest value among the measurement results corresponding to the N3 CSI-RS resources.

In some embodiments, a value of N may be determined based on at least one of followings: resource pool configuration information, indication information sent by the terminal device to the second terminal device, or indication information sent by the second terminal device to the terminal device.

In some embodiments, the measurement results may include the RSRP and/or the SINR.

In some embodiments, the first information may be carried by SCI, or MAC CE, or PSFCH, or PC5-RRC signaling.

In some embodiments, the terminal device may further include a processing unit, and the processing unit is configured to select a target CSI-RS resource based on the first information, a spatial domain transmission filter corresponding to the target CSI-RS resource being the target spatial domain transmission filter.

In some embodiments, the communication unit 410 is further configured to send second SL configuration information to the second terminal device. The second SL configuration information is configured to configure at least one TCI state, the at least one TCI state includes a first TCI state, a reference signal included in the first TCI state is a CSI-RS corresponding to the target CSI-RS resource determined by the terminal device based on the first information.

In some embodiments, a QCL type included in the first TCI state may be QCL-TypeD.

In some embodiments, the communication unit 410 is further configured to send sixth indication information to the second terminal device, the sixth indication information being configured to indicate the first TCI state.

In some embodiments, the communication unit 410 is further configured to perform SL transmission by using the target spatial domain transmission filter corresponding to the target CSI-RS resource.

In some embodiments, the communication unit 410 is further configured to receive the first information from the second terminal device in a first time unit, the first time unit being located after a second time unit determined based on a latency boundary.

In some embodiments, the communication unit 410 is further configured to receive second information from the second terminal device.

The second information is configured to indicate that the second terminal device fails to detect a CSI-RS or measurement results of CSI-RSs detected by the second terminal device are all less than a first threshold; or, the second information is configured to indicate that the terminal device resends the M CSI-RSs.

In some embodiments, the communication unit 410 is further configured to send the M CSI-RSs to the second terminal device respectively by reusing the spatial domain transmission filter.

In some embodiments, the communication unit 410 is further configured to receive the third information from the second terminal device in a third time unit. The third time unit is located after a fourth time unit determined based on a latency boundary.

In some embodiments, the first threshold may be preconfigured or agreed on in a protocol; or, the first threshold may be configured by a network device; or, the first threshold may be configured by the terminal device. Optionally, in some embodiments, the above communication unit may be a communication interface or a transceiver, or an input/output (I/O) interface of a communication chip or a system-on-chip (SOC). The above processing unit may be one or more processors.

It should be understood that the terminal device 400 according to the embodiment of the disclosure may correspond to the first terminal in the method embodiments of the disclosure, and the foregoing and other operations and/or functions of each unit in the terminal device 400 implement corresponding processes of the first terminal device in the method 200 shown in FIG. 11 respectively, which are not elaborated here, for the sake of brevity.

Figure 23:
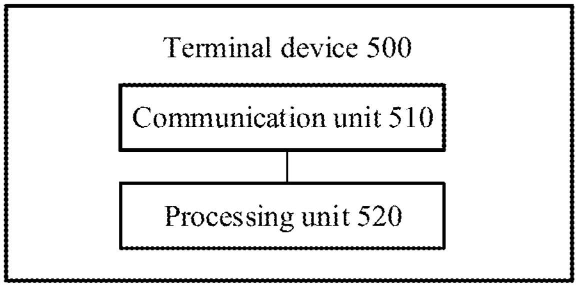
FIG. 23 is a schematic block diagram of another terminal device according to an embodiment of the disclosure.

FIG. 23 is a schematic block diagram of a terminal device according to another embodiment of the disclosure. The terminal device 500 of FIG. 23 includes a communication unit 510.

The communication unit 510 is configured to receive M CSI-RSs from a first terminal device, the M CSI-RSs being configured to select a target spatial domain transmission filter, the M CSI-RSs corresponding to a plurality of CSI-RS resources in a target CSI-RS resource set, and M being a positive integer.

In some embodiments, a repetition field in configuration information of the target CSI-RS resource set may take a first value.

The first value is configured to indicate that the first terminal device does not use a same spatial domain transmission filter to send the CSI-RS resources in the target CSI-RS resource set.

In some embodiments, the communication unit 510 is further configured to receive first SL configuration information from the first terminal device.

The first SL configuration information may include at least one of: an index of the target CSI-RS resource set; indexes of CSI-RS resources included in the target CSI-RS resource set; the number of the CSI-RS resources included in the target CSI-RS resource set; a value of M; correspondences between a CSI-RS resource set and CSI report quantity; quantity of CSI-RS resources reported or fed back by the terminal device to the first terminal device; a latency boundary; a value of a repetition field corresponding to the target CSI-RS resource set; transmission resource information configured for the first terminal device to send the M CSI-RSs; or a transmission mode of the first terminal device.

The repetition field corresponding to the target CSI-RS resource set may take a first value to indicate that the first terminal device does not use a same spatial domain transmission filter to send CSI-RSs, and the repetition field corresponding to the target CSI-RS resource set may take a second value to indicate that the first terminal device uses the same spatial domain transmission filter to send CSI-RSs.

In some embodiments, within the latency boundary, the first terminal device does not expect the terminal device to perform reporting or feedback for CSI-RSs; and/or, after exceeding the latency boundary, the terminal device is allowed to perform the reporting or feedback for CSI-RSs; and/or, after exceeding the latency boundary, the terminal device does not expect the first terminal device to send CSI-RSs; and/or, after exceeding the latency boundary, the terminal device stops receiving CSI-RSs from the first terminal device.

In some embodiments, the communication unit 510 is further configured to receive third indication information from the first terminal device.

The third indication information is configured to indicate at least one of followings: the first terminal device being about to send CSI-RSs configured to select the target spatial domain transmission filter; the first terminal device being about to use different spatial domain transmission filters to send CSI-RSs; CSI report quantity; an index of a first CSI-RS resource sent by the first terminal device; or a time gap for the first terminal device to send the first CSI-RS resource.

The time gap may take a time unit where the third indication information is located as reference.

In some embodiments, the communication unit 510 is further configured to receive fourth indication information from the first terminal device.

The fourth indication information is configured to indicate that CSI-RSs sent by the first terminal device are configured to select a spatial domain transmission filter configured for the first terminal device to transmit SL data; or, the fourth indication information is configured to indicate that the CSI-RSs sent by the first terminal device are configured to select a spatial domain receiving filter used by the terminal device to receive SL data; or, the fourth indication information is configured to indicate that the CSI-RSs sent by the first terminal device are configured to select and measure CSI.

In some embodiments, the CSI report quantity may include at least one of: CRI; CRI and RSRP; CRI and SINR; slot indicator; slot indicator and RSRP; slot indicator and SINR; or no report.

In some embodiments, the first SL configuration information may be carried by SCI, or MAC CE, or PC5-RRC signaling.

In some embodiments, the third indication information may be carried by PC5-RRC signaling, or SCI, or MAC CE, or sidelink feedback information.

In some embodiments, the fourth indication information may be carried by PC5-RRC signaling, or SCI, or MAC CE, or sidelink feedback information.

In some embodiments, the communication unit 510 is further configured to receive CSI-RS resource indication information corresponding to CSI-RSs carried in SCI associated with the CSI-RSs from the first terminal device each time when the first terminal device sends the CSI-RSs to the terminal device by using spatial domain transmission filters.

In some embodiments, the CSI-RS resource indication information corresponding to the CSI-RSs may include an index of a CSI-RS resource set corresponding to the CSI-RSs and/or an index of a CSI-RS resource.

In some embodiments, the communication unit 510 is further configured to send first information to the first terminal device.

The first information may include target CSI report quantity, the target CSI report quantity including at least one of: CRI; CRI and RSRP; CRI and SINR; slot indicator; slot indicator and RSRP; or slot indicator and SINR.

Slot indicator information is configured to determine slots corresponding to CSI-RSs sent by the first terminal device; or, the slot indicator information is configured to determine indexes corresponding to CSI-RS resources sent by the first terminal device.

In some embodiments, the first information may include indexes of N CSI-RS resources; or, the first information is configured to determine the indexes of the N CSI-RS resources, the N CSI-RS resources being determined by the terminal device based on measurement results of received CSI-RSs, N being quantity of CSI-RS resources required to be reported or fed back by the terminal device, N being a positive integer, and N≤M.

In some embodiments, the indexes of the N CSI-RS resources may be arranged in a descending order of measurement results corresponding to N CSI-RSs or in an ascending order of the measurement results corresponding to the N CSI-RSs.

In some embodiments, the first information may further include first measurement information, and the first measurement information is configured to indicate measurement results corresponding to the N CSI-RS resources.

In some embodiments, measurement results corresponding to the N CSI-RS resources may be equal to or greater than a first threshold.

In some embodiments, the N CSI-RS resources may include N1 first-type CSI-RS resources and N2 second-type CSI-RS resources, measurement results corresponding to the N1 first-type CSI-RS resources may be equal to or greater than a first threshold, and indexes of the N2 second-type CSI-RS resources may be determined by at least one of the N1 first-type CSI-RS resources or by at least one of CSI-RS resources other than the N1 first-type CSI-RS resources among the plurality of CSI-RS resources, measurement results corresponding to the N2 second-type CSI-RS resources are default values, N1 and N2 are positive integers, and N1+N2=N.

In some embodiments, the first measurement information may include quantization index information of the measurement results respectively corresponding to the N CSI-RS resources.

In some embodiments, the first measurement information may include quantization index information of a first measurement result and N−1 pieces of differential quantization index information, and the first measurement result corresponds to a highest value among the measurement results corresponding to the N CSI-RS resources.

In some embodiments, the first information may include indexes of N3 CSI-RS resources, and the N3 CSI-RS resources may be determined by the terminal device according to measurement results obtained by measuring received CSI-RSs, N3<N, N representing quantity of CSI-RS resources required to be fed back or reported by the terminal device, N3 and N being positive integers, and N≤M.

In some embodiments, measurement results corresponding to the N3 CSI-RS resources may be equal to or greater than a first threshold.

In some embodiments, the first information may further include fifth indication information, and the fifth indication information is configured to indicate a value of N3.

In some embodiments, the first information may further include second measurement information, and the second measurement information is configured to indicate measurement results corresponding to the N3 CSI-RS resources.

In some embodiments, the second measurement information may include quantization index information of the measurement results respectively corresponding to the N3 CSI-RS resources.

In some embodiments, the second measurement information may include quantization index information of a second measurement result and N3-1 pieces of differential quantization index information, and the second measurement result corresponds to a highest value among the measurement results corresponding to the N3 CSI-RS resources.

In some embodiments, a value of N may be determined based on at least one of followings: resource pool configuration information, indication information sent by the first terminal device to the terminal device, or indication information sent by the terminal device to the first terminal device.

In some embodiments, the measurement results may include the RSRP and/or the SINR.

In some embodiments, the first information may be carried by SCI, or MAC CE, or PSFCH, or PC5-RRC signaling.

In some embodiments, the communication unit 510 is further configured to receive second SL configuration information from the first terminal device, the second SL configuration information is configured to configure at least one TCI state, the at least one TCI state includes a first TCI state, a reference signal included in the first TCI state is a CSI-RS corresponding to a target CSI-RS resource determined by the first terminal device based on the first information.

In some embodiments, a QCL type included in the first TCI state may be QCL-TypeD.

In some embodiments, the communication unit 510 is further configured to receive sixth indication information from the first terminal device, and the sixth indication information is configured to indicate the first TCI state.

In some embodiments, the communication unit 510 is further configured to receive SL data from the first terminal device using a spatial domain transmission filter corresponding to the target CSI-RS resource.

In some embodiments, the communication unit 510 is further configured to send the first information to the first terminal device in a first time unit, and the first time unit is located after a second time unit determined based on a latency boundary.

In some embodiments, the communication unit 510 is further configured to send second information to the first terminal device.

The second information is configured to indicate that the terminal device does not detect CSI-RSs or measurement results of CSI-RSs detected by the terminal device are all less than a first threshold; or, the second information is configured to indicate that the first terminal device resends the M CSI-RSs.

In some embodiments, the communication unit 510 is further configured to send the second information to the first terminal device in a third time unit, and the third time unit is located after a fourth time unit determined based on a latency boundary.

In some embodiments, the first threshold may be preconfigured or agreed on in a protocol; or, the first threshold may be configured by a network device; or, the first threshold may be configured by the first terminal device.

Optionally, in some embodiments, the above communication unit may be a communication interface or a transceiver, or an I/O interface of a communication chip or a SOC. The above processing unit may be one or more processors.

It should be understood that the terminal device 500 according to the embodiment of the disclosure may correspond to the second terminal in the method embodiments of the disclosure, and the foregoing and other operations and/or functions of each unit in the terminal device 500 implement corresponding processes of the second terminal in the method 200 shown in FIG. 11 respectively, which are not elaborated here, for the sake of brevity.

Figure 24:
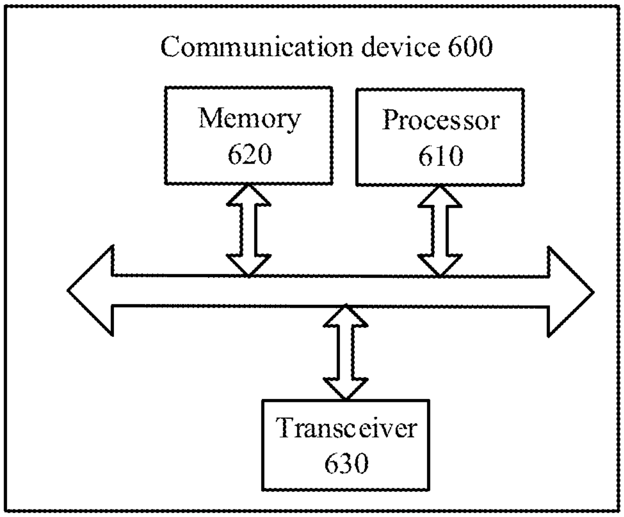
FIG. 24 is a schematic block diagram of a communication device according to an embodiment of the disclosure.

FIG. 24 is a schematic structural diagram of a communication device 600 according to an embodiment of the disclosure. The communications device 600 shown in FIG. 24 includes a processor 610, and the processor 610 may call and run a computer program from a memory, to implement the methods in the embodiments of the disclosure.

Optionally, as shown in FIG. 24, the communications device 600 may further include a memory 620. The processor 610 may call and run a computer program from the memory 620, to implement the methods in the embodiments of the disclosure.

The memory 620 may be a separate device independent of the processor 610, or may be integrated in the processor 610.

Optionally, as shown in FIG. 24, the communication device 600 may further include a transceiver 630, and the processor 610 may control the transceiver 630 to communicate with other devices. Specifically, the processor 610 may control the transceiver 630 to send information or data to other devices, or receive information or data from other devices.

The transceiver 630 may include a transmitter and a receiver. The transceiver 630 may further include an antenna, and there may be one or more antennas in number.

Optionally, the communication device 600 may specifically be the first terminal device in the embodiments of the disclosure, and the communication device 600 may implement corresponding processes implemented by the first terminal in each method of the embodiments of the disclosure, which are not elaborated here, for the sake of brevity.

In some embodiments, the transceiver 630 in the communication device 600 may correspond to the communication unit 410 in the terminal device 400 shown in FIG. 22, and the transceiver 630 may perform operations or functions performed by the communication unit 410, which are not elaborated here, for the sake of brevity.

In some embodiments, the processor 610 in the communication device 600 may correspond to the processing unit 420 in the terminal device 400 shown in FIG. 22, and the processor 610 may perform operations or functions performed by the processing unit 420, which are not elaborated here, for the sake of brevity.

Optionally, the communication device 600 may specifically be the second terminal device in the embodiments of the disclosure, and the communication device 600 may implement corresponding processes implemented by the second terminal device in each method of the embodiments of the disclosure, which are not elaborated here, for the sake of brevity.

In some embodiments, the transceiver 630 in the communication device 600 may correspond to the communication unit 510 in the terminal device 500 shown in FIG. 23, and the transceiver 630 may perform operations or functions performed by the communication unit 510, which are not elaborated here, for the sake of brevity.

In some embodiments, the processor 610 in the communication device 600 may correspond to the processing unit 520 in the terminal device 500 shown in FIG. 23, and the processor 610 may perform operations or functions performed by the processing unit 520, which are not elaborated here, for the sake of brevity.

Figure 25:
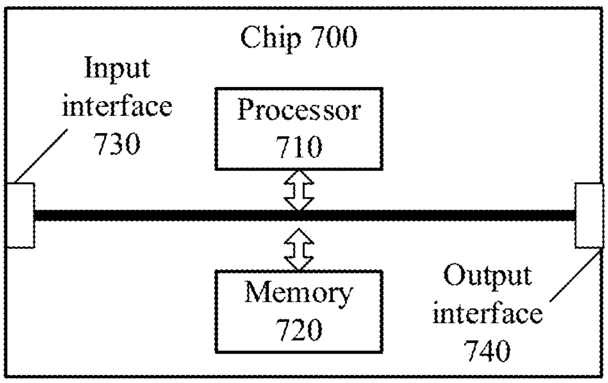
FIG. 25 is a schematic block diagram of a chip according to an embodiment of the disclosure.

FIG. 25 is a schematic structural diagram of a chip according to an embodiment of the disclosure. The chip 700 shown in FIG. 25 includes a processor 710, and the processor 710 may call and run a computer program from a memory, to implement the methods in the embodiments of the disclosure.

Optionally, as shown in FIG. 25, the chip 700 may further include a memory 720.

The processor 710 may call and run a computer program from the memory 720, to implement the methods in the embodiments of the disclosure.

The memory 720 may be a separate device independent of the processor 710, or may be integrated in the processor 710.

Optionally, the chip 700 may further include an input interface 730. The processor 710 may control the input interface 730 to communicate with other devices or chips. Specifically, the processor 710 may control the input interface 730 to acquire information or data sent by other devices or chips.

Optionally, the chip 700 may further include an output interface 740. The processor 710 may control the output interface 740 to communicate with other devices or chips. Specifically, the processor 710 may control the output interface 740 to output information or data to other devices or chips.

Optionally, the chip may be applied to the first terminal device in the embodiments of the disclosure, and the chip may implement corresponding processes implemented by the first terminal in each method of the embodiments of the disclosure, which are not elaborated here, for the sake of brevity.

In some embodiments, the processor 710 in the chip 700 may correspond to the processing unit 420 in the terminal device 400 shown in FIG. 22, and the processor 710 may perform operations or functions performed by the processing unit 420, which are not elaborated here, for the sake of brevity.

In some embodiments, the input interface 730 and the output interface 740 in the chip 700 may correspond to the communication unit 410 in the terminal device 400 shown in FIG. 22, and the input interface 730 and the output interface 740 may perform operations or functions performed by the communication unit 410, which are not elaborated here, for the sake of brevity.

Optionally, the chip may be applied to the second terminal device in the embodiments of the disclosure, and the chip may implement corresponding processes implemented by the second terminal device in each method of the embodiments of the disclosure, which are not elaborated here, for the sake of brevity.

In some embodiments, the processor 710 in the chip 700 may correspond to the processing unit 520 in the terminal device 500 shown in FIG. 23, and the processor 710 may perform operations or functions performed by the processing unit 520, which are not elaborated here, for the sake of brevity.

In some embodiments, the input interface 730 and the output interface 740 in the chip 700 may correspond to the communication unit 510 in the terminal device 500 shown in FIG. 23, and the input interface 730 and the output interface 740 may perform operations or functions performed by the communication unit 510, which are not elaborated here, for the sake of brevity.

It should be understood that the chip mentioned in the embodiments of the disclosure may also be referred to as a system-level chip, a system chip, a chip system, or a SOC chip, etc.

Figure 26:
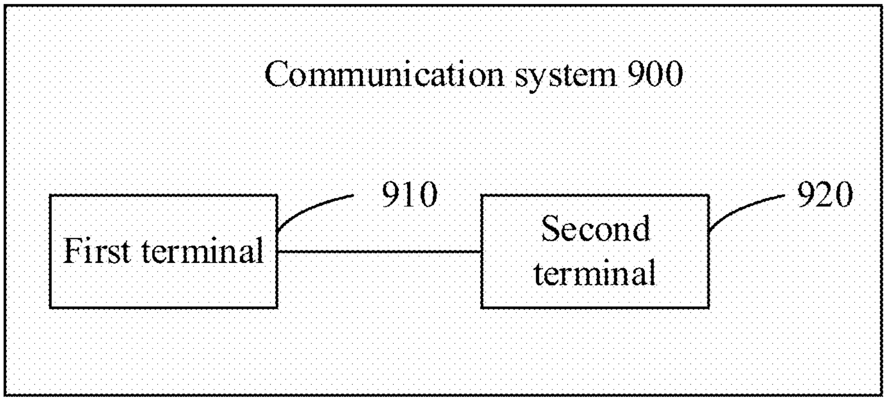
FIG. 26 is a schematic block diagram of a communication system according to an embodiment of the disclosure.

FIG. 26 is a schematic block diagram of a communication system 900 according to an embodiment of the disclosure. As shown in FIG. 26, the communication system 900 includes a first terminal 910 and a second terminal 920.

The first terminal 910 may be configured to implement corresponding functions implemented by the first terminal device in the above methods, and the second terminal 920 may be configured to implement corresponding functions implemented by the second terminal device in the above methods, which are not elaborated here, for the sake of brevity.

It should be understood that the processor in the embodiments may be an integrated circuit chip with signal processing capability. During implementation, each operation of the above method embodiments may be completed by an integrated logic circuit in form of hardware in a processor or instructions in form of software. The above processor may be a general-purpose processor, a Digital Signal Processor (DSP), an Application Specific Integrated Circuit (ASIC), a Field Programmable Gate Array (FPGA) or other programmable logic devices, discrete gates or transistor logic devices, discrete hardware components, so that various methods, operations and logic block diagrams disclosed in the embodiments may be implemented or executed. The general-purpose processor may be a microprocessor, or the processor may be any conventional processor, etc. Operations of the methods disclosed in combination with the embodiments may be directly embodied as being performed and completed by a hardware decoding processor, or by a combination of hardware in the decoding processor and software modules. The software modules may be located in a mature storage medium in the field, such as a Random Access Memory (RAM), a flash memory, a Read-Only Memory (ROM), a Programmable ROM (PROM), or an electrically erasable programmable memory, a register, etc. The storage medium is located in a memory, and the processor reads information in the memory, and completes operations of the above methods in combination with hardware thereof.

It may be understood that the memory in the embodiments may be a volatile memory or a non-volatile memory, or may include both volatile and non-volatile memories. The non-volatile memory may be a ROM, a PROM, an Erasable PROM (EPROM), an Electrically EPROM (EEPROM) or a flash memory. The volatile memory may be a RAM which is used as an external cache. By way of exemplary rather than limiting descriptions, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memories of the systems and methods described here are intended to include, but are not limited to these and any other suitable types of memories.

It should be understood that the above memories are exemplary rather than limiting descriptions. For example, the memory in the embodiments may also be a SRAM, a DRAM, a SDRAM, a DDR SDRAM, an ESDRAM, a SLDRAM, a DR RAM, etc. That is, the memory in the embodiments is intended to include, but is not limited to these and any other suitable types of memories.

An embodiment further provides a computer-readable storage medium, the computer-readable storage medium is configured to store a computer program.

Optionally, the computer-readable storage medium may be applied to the first terminal device in the embodiments, and the computer program enables a computer to execute corresponding processes implemented by the first terminal device in each method of the embodiments, which are not elaborated here, for the sake of brevity.

Optionally, the computer-readable storage medium may be applied to the second terminal device in the embodiments, and the computer program enables a computer to execute corresponding processes implemented by the second terminal device in each method of the embodiments, which are not elaborated here, for the sake of brevity.

An embodiment further provides a computer program product, the computer program product includes computer program instructions.

Optionally, the computer program product may be applied to the first terminal device in the embodiments, and the computer program instructions enable a computer to execute corresponding processes implemented by the first terminal device in each method of the embodiments, which are not elaborated here, for the sake of brevity.

Optionally, the computer program product may be applied to the second terminal device in the embodiments, and the computer program instructions enable a computer to execute corresponding processes implemented by the second terminal device in each method of the embodiments, which are not elaborated here, for the sake of brevity.

An embodiment further provides a computer program.

Optionally, the computer program may be applied to the first terminal device in the embodiments, and the computer program enables a computer to execute corresponding processes implemented by the first terminal device in each method of the embodiments when the computer program is run on the computer, which are not elaborated here, for the sake of brevity.

Optionally, the computer program may be applied to the second terminal device in the embodiments, and the computer program enables a computer to execute corresponding processes implemented by the second terminal device in each method of the embodiments when the computer program is run on the computer, which are not elaborated here, for the sake of brevity.

It may be appreciated by those of ordinary skill in the art that units and algorithm steps of each example described in combination with the embodiments disclosed here may be implemented by electronic hardware, or a combination of computer software and electronic hardware. Whether these functions are executed by hardware or software, depends on specific applications and design constraints of the technical solutions. Professional technicians may use different methods in each specific application to implement the described functions, however, such implementation should not be considered as going beyond the scope of the disclosure.

It may be clearly understood by those skilled in the art that for the sake of convenience and brevity of descriptions, specific operation processes of the above systems, apparatuses and units may refer to corresponding processes in the foregoing method embodiments, which are not elaborated here.

In several embodiments, it should be understood that the disclosed systems, apparatuses and methods may be implemented in other ways. For example, the above apparatus embodiments are only illustrative. For example, division of the units is only a logical function division. In a practical implementation, there may be other division manners. For example, multiple units or components may be combined or may be integrated into another system, or some features may be ignored or may not be executed. In another point, mutual coupling or direct coupling or communication connection as shown or discussed may be indirect coupling or communication connection through some interfaces, apparatuses or units, and may be in electrical, mechanical or other forms.

The units described as separate components may be or may not be physically separated, and the components displayed as units may be or may not be physical units, that is, they may be located at one place, or may be distributed on multiple network units. Part or all of the units may be selected according to actual requirements, to achieve the purpose of the solutions of the embodiments.

Furthermore, each function unit in each embodiment may be integrated into one processing unit, or each unit may separately exist physically, or two or more units may be integrated into one unit.

When the functions are implemented in form of a software function unit and sold or used as an independent product, the functions may be stored in a computer-readable storage medium. Based on such understanding, the technical solutions of the disclosure substantially or parts making contributions to the related art or part of the technical solutions may be embodied in form of a software product, and the computer software product is stored in a storage medium, includes several instructions to enable a computer device (which may be a personal computer, a server, or a network device, etc.) to execute all or part of operations of the method described in each embodiment. The foregoing storage medium includes various media capable of storing program codes, such as a U disk, a mobile hard disk, a ROM, a RAM, a magnetic disk, or an optical disk, etc.

The above descriptions are only specific implementations, however, the scope of protection of the disclosure is not limited thereto. Variations or substitutions easily conceived by any technician familiar with this technical field within the technical scope as disclosed should fall within the scope of protection of the disclosure. Therefore, the scope of protection of the disclosure shall be subjected to the scope of protection of the claims.

The invention claimed is:

1. A method for wireless communication, comprising:

sending, by a first terminal device, M Channel State Information Reference Signals (CSI-RSs) to a second terminal device by using spatial domain transmission filters, the M CSI-RSs being configured to select a target spatial domain transmission filter, wherein the M CSI-RSs correspond to a plurality of CSI-RS resources in a target CSI-RS resource set, and M is a positive integer, the method further comprising:

sending, by the first terminal device, first indication information to a network device, the first indication information being configured to indicate that the first terminal device requests the network device to allocate transmission resources for sending CSI-RSs, wherein the first indication information comprises a value of M; and receiving, by the first terminal device, first configuration information from the network device, the first configuration information comprising the transmission resources allocated by the network device to the first terminal device for sending CSI-RSs, wherein the first configuration information comprises second indication information, and the second indication information is configured to indicate that the transmission resources allocated by the network device are configured to send CSI-RSs configured to select the target spatial domain transmission filter, wherein the first indication information is carried by a Physical Uplink Control Channel (PUCCH) or uplink Radio Resource Control (RRC) signaling, wherein the second indication information is carried by Downlink Control Information (DCI) or Radio Resource Control (RRC) signaling.

2. The method of claim 1, wherein a repetition field in configuration information of the target CSI-RS resource set takes a first value, wherein the first value is configured to indicate that the first terminal device does not use a same spatial domain transmission filter to send the CSI-RS resources in the target CSI-RS resource set.

3. The method of claim 1, further comprising:

sending, by the first terminal device, first sidelink (SL) configuration information to the second terminal device, wherein the first SL configuration information comprises at least one of followings:

an index of the target CSI-RS resource set; indexes of CSI-RS resources comprised in the target CSI-RS resource set; quantity of the CSI-RS resources comprised in the target CSI-RS resource set; a value of M; correspondences between a CSI-RS resource set and Channel State Information (CSI) report quantity; quantity of CSI-RS resources reported or fed back by the second terminal device to the first terminal device; a latency boundary; a value of a repetition field corresponding to the target CSI-RS resource set; transmission resource information configured for the first terminal device to send the M CSI-RSs; resource pool information corresponding to transmission resources used for the M CSI-RSs; or a transmission mode of the first terminal device, wherein the repetition field corresponding to the target CSI-RS resource set takes a first value to indicate that the first terminal device does not use a same spatial domain transmission filter to send CSI-RSs, and the repetition field corresponding to the target CSI-RS resource set takes a second value to indicate that the first terminal device uses the same spatial domain transmission filter to send CSI-RSs.

4. The method of claim 3, wherein at least one of following processes is implemented:

within the latency boundary, the first terminal device does not expect the second terminal device to perform reporting or feedback for CSI-RSs; or, after exceeding the latency boundary, the second terminal device is allowed to perform the reporting or feedback for CSI-RSs; or, after exceeding the latency boundary, the first terminal device is not expected by the second terminal device to send CSI-RSs; or, after exceeding the latency boundary, CSI-RSs are stopped from being received by the second terminal device from the first terminal device.

5. The method of claim 1, further comprising:

sending, by the first terminal device, third indication information to the second terminal device, wherein the third indication information is configured to indicate at least one of followings: the first terminal device being about to send CSI-RSs configured to select the target spatial domain transmission filter; the first terminal device being about to use different spatial domain transmission filters to send CSI-RSs; Channel State Information (CSI) report quantity; an index of a first CSI-RS resource sent by the first terminal device; or a time gap for the first terminal device to send the first CSI-RS resource, wherein the time gap takes a time unit where the third indication information is located as reference;

or, sending, by the first terminal device, fourth indication information to the second terminal device, wherein the fourth indication information is configured to indicate that CSI-RSs sent by the first terminal device are configured to select a spatial domain transmission filter configured for the first terminal device to transmit sidelink (SL) data; or, the fourth indication information is configured to indicate that CSI-RSs sent by the first terminal device are configured to select a spatial domain receiving filter used for the second terminal device to receive SL data; or, the fourth indication information is configured to indicate that CSI-RSs sent by the first terminal device are configured to measure Channel State Information (CSI);

or, determining, by the first terminal device, the target CSI-RS resource set based on a first CSI-RS resource set comprised in sidelink (SL) Band Width Part (BWP) configuration information or resource pool configuration information; and determining, by the first terminal device, CSI-RS resources comprised in the target CSI-RS resource set based on CSI-RS resources comprised in the first CSI-RS resource set.

6. The method of claim 3, wherein the CSI report quantity comprises at least one of followings: CSI-RS Resource Indicator (CRI); CRI and Reference Signal Receiving Power (RSRP); CRI and Signal to Interference plus Noise Ratio (SINR); slot indicator; slot indicator and RSRP; slot indicator and SINR; or no report, wherein the first SL configuration information is carried by Sidelink Control Information (SCI), or Media Access Control Control Element (MAC CE), or PC5-Radio Resource Control (RRC) signaling.

7. The method of claim 5, wherein the third indication information is carried by PC5-Radio Resource Control (RRC) signaling, or Sidelink Control Information (SCI), or Media Access Control Control Element (MAC CE), or sidelink feedback information, the fourth indication information is carried by PC5-Radio Resource Control (RRC) signaling, or Sidelink Control Information (SCI), or Media Access Control Control Element (MAC CE), or sidelink feedback information.

8. The method of claim 1, further comprising:

carrying CSI-RS resource indication information corresponding to CSI-RSs, by the first terminal device, in Sidelink Control Information (SCI) associated with the CSI-RSs when the first terminal device sends the CSI-RSs to the second terminal device by using the spatial domain transmission filters, wherein the CSI-RS resource indication information corresponding to the CSI-RSs comprises at least one of: an index of a CSI-RS resource set corresponding to the CSI-RSs, or an index of a CSI-RS resource.

9. The method of claim 1, further comprising:

receiving, by the first terminal device, first information from the second terminal device, wherein the first information comprises a target Channel State Information (CSI) report quantity, and the target CSI report quantity comprises at least one of followings:

CRI; CRI and RSRP; CRI and SINR; slot indicator; slot indicator and RSRP; or slot indicator and SINR, wherein slot indicator is configured to determine slots corresponding to CSI-RSs sent by the first terminal device; or, the slot indicator is configured to determine indexes corresponding to CSI-RS resources sent by the first terminal device.

10. The method of claim 9, wherein the first information comprises indexes of N CSI-RS resources; or, the first information is configured to determine indexes of N CSI-RS resources, wherein the N CSI-RS resources are determined by the second terminal device according to measurement results of received CSI-RSs, N represents quantity of CSI-RS resources required to be reported or fed back by the second terminal device, Nis a positive integer, and N≤M, wherein the indexes of the N CSI-RS resources are arranged in a descending order of measurement results corresponding to the N CSI-RSs; or, the indexes of the N CSI-RS resources are arranged in an ascending order of measurement results corresponding to the N CSI-RSS, wherein the first information further comprises first measurement information, and the first measurement information is configured to indicate the measurement results corresponding to the N CSI-RS resources, wherein the measurement results corresponding to the N CSI-RS resources are equal to or greater than a first threshold, wherein the N CSI-RS resources comprise N1 first-type CSI-RS resources and N2 second-type CSI-RS resources, wherein measurement results corresponding to the N1 first-type CSI-RS resources are equal to or greater than a first threshold, indexes of the N2 second-type CSI-RS resources are determined by at least one of the N1 first-type CSI-RS resources or determined by at least one of CSI-RS resources other than the N1 first-type CSI-RS resources among the plurality of CSI-RS resources, and measurement results corresponding to the N2 second-type CSI-RS resources are default values, N1 and N2 being positive integers, and N1+N2=N, wherein the first measurement information comprises quantization index information of the measurement results respectively corresponding to the N CSI-RS resources, wherein the first measurement information comprises quantization index information of a first measurement result and N−1 pieces of differential quantization index information, and the first measurement result corresponds to a highest value among the measurement results corresponding to the N CSI-RS resources.

11. The method of claim 9, wherein the first information comprises indexes of N3 CSI-RS resources, and the N3 CSI-RS resources are determined by the second terminal device according to measurement results obtained by measuring received CSI-RSs, N3<N, N representing quantity of CSI-RS resources required to be fed back or reported by the second terminal device, N3 and N being positive integers, and N≤M, wherein measurement results corresponding to the N3 CSI-RS resources are equal to or greater than a first threshold, wherein the first information further comprises fifth indication information, and the fifth indication information is configured to indicate a value of N3, wherein the first information further comprises second measurement information, and the second measurement information is configured to indicate measurement results corresponding to the N3 CSI-RS resources, wherein the second measurement information comprises quantization index information of the measurement results respectively corresponding to the N3 CSI-RS resources, or the second measurement information comprises quantization index information of a second measurement result and N3−1 differential quantization index information, the second measurement result corresponds to a highest value among the measurement results corresponding to the N3 CSI-RS resources.

12. The method of claim 10, wherein a value of N is determined based on at least one of followings: resource pool configuration information; indication information sent by the first terminal device to the second terminal device; or indication information sent by the second terminal device to the first terminal device, wherein the measurement results comprise at least one of the RSRP or the SINR, wherein the first information is carried by Sidelink Control Information (SCI), or Media Access Control Control Element (MAC CE), or Physical Sidelink Feedback Channel (PSFCH), or PC5-Radio Resource Control (RRC) signaling.

13. The method of claim 9, further comprising:

selecting, by the first terminal device, a target CSI-RS resource based on the first information, wherein a spatial domain transmission filter corresponding to the target CSI-RS resource is the target spatial domain transmission filter;

sending, by the first terminal device, second sidelink (SL) configuration information to the second terminal device, wherein the second SL configuration information is configured to configure at least one Transmission Configuration Indicator (TCI) state, the at least one TCI state comprises a first TCI state, and a reference signal comprised in the first TCI state is a CSI-RS corresponding to the target CSI-RS resource determined by the first terminal device based on the first information, and a quasi-co-located (QCL) type comprised in the first TCI state is QCL-TypeD;

sending, by the first terminal device, sixth indication information to the second terminal device, the sixth indication information being configured to indicate the first TCI state; and performing, by the first terminal device, sidelink (SL) transmission by using the target spatial domain transmission filter corresponding to the target CSI-RS resource, wherein receiving, by the first terminal device, the first information from the second terminal device comprises:

receiving, by the first terminal device, the first information from the second terminal device in a first time unit, the first time unit being located after a second time unit determined based on a latency boundary.

14. The method of claim 1, further comprising:

receiving, by the first terminal device, second information from the second terminal device, wherein the second information is configured to indicate that the second terminal device fails to detect a CSI-RS or that measurement results of CSI-RSs detected by the second terminal device are all less than a first threshold; or, the second information is configured to indicate that the first terminal device resends the M CSI-RSs; and sending, by the first terminal device, the M CSI-RSs to the second terminal device respectively by reusing the spatial domain transmission filters, wherein receiving third information by the first terminal device from the second terminal device comprises:

receiving, by the first terminal device, the third information from the second terminal device in a third time unit, wherein the third time unit is located after a fourth time unit determined based on a latency boundary.

15. The method of claim 10, wherein the first threshold is pre-configured or agreed on in a protocol; or, the first threshold is configured by a network device; or, the first threshold is configured by the first terminal device.

16. A terminal device, comprising:

a processor; and a transceiver, connected to the processor and configured to send M Channel State Information Reference Signals (CSI-RSs) to a second terminal device by using spatial domain transmission filters, wherein the M CSI-RSs are configured to select a target spatial domain transmission filter, the M CSI-RSs correspond to a plurality of CSI-RS resources in a target CSI-RS resource set, and M is a positive integer, wherein the transceiver is further configured to:

send first indication information to a network device, the first indication information being configured to indicate that the first terminal device requests the network device to allocate transmission resources for sending CSI-RSs, wherein the first indication information comprises a value of M; and receive first configuration information from the network device, the first configuration information comprising the transmission resources allocated by the network device to the first terminal device for sending CSI-RSs, wherein the first configuration information comprises second indication information, and the second indication information is configured to indicate that the transmission resources allocated by the network device are configured to send CSI-RSs configured to select the target spatial domain transmission filter, wherein the first indication information is carried by a Physical Uplink Control Channel (PUCCH) or uplink Radio Resource Control (RRC) signaling, wherein the second indication information is carried by Downlink Control Information (DCI) or Radio Resource Control (RRC) signaling.

* * * * *